United States Patent
Suenaga et al.

(10) Patent No.: US 8,605,776 B2
(45) Date of Patent: Dec. 10, 2013

(54) PROXIMITY CONTACTLESS COMMUNICATION APPARATUS CAPABLE OF SELECTING APPROPRIATE ENCODING METHOD ACCORDING TO BANDWIDTH BETWEEN ANTENNAS

(71) Applicant: Panasonic Corporation, Osaka (JP)

(72) Inventors: Hiroshi Suenaga, Osaka (JP); Kohei Masuda, Osaka (JP); Hiroshi Tanaka, Osaka (JP); Tsuyoshi Ikushima, Nara (JP); Takeshi Nakayama, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/896,730

(22) Filed: May 17, 2013

(65) Prior Publication Data
US 2013/0251017 A1 Sep. 26, 2013

Related U.S. Application Data

(63) Continuation of application No. PCT/JP2012/006360, filed on Oct. 3, 2012.

(30) Foreign Application Priority Data

Oct. 13, 2011 (JP) ................................. 2011-225588

(51) Int. Cl.
H04B 1/10 (2006.01)
(52) U.S. Cl.
USPC ........... 375/224; 375/219; 375/228; 375/282; 455/67.11; 455/67.14; 455/115.1; 455/115.2
(58) Field of Classification Search
USPC ............... 375/219, 224, 228, 282; 455/67.11, 455/67.14, 115.1, 115.2
See application file for complete search history.

(56) References Cited

U.S. PATENT DOCUMENTS

2008/0292037 A1* 11/2008 Fujita et al. .................... 375/354
2009/0273418 A1 11/2009 Shimizu et al.

FOREIGN PATENT DOCUMENTS

| JP | 2004-342243 A | 12/2004 |
| JP | 2006-287922 | 10/2006 |
| JP | 2009-268022 A | 11/2009 |

OTHER PUBLICATIONS

International Search Report for corresponding International Application No. PCT/JP2012/006360 mailed Dec. 4, 2012.
Form PCT/ISA/237 for corresponding International Application No. PCT/JP2012/006360 dated Dec. 4, 2012.

* cited by examiner

Primary Examiner — Daniel Washburn
Assistant Examiner — Eboni Hughes
(74) Attorney, Agent, or Firm — Renner, Otto, Boisselle & Sklar, LLP

(57) ABSTRACT

A comparator circuit compares a test pattern generated by a test pattern generator circuit, with a test pattern transmitted to a memory card and returned from the memory card. A control circuit determines a bandwidth corresponding to frequency components correctly transmitted between a host apparatus and the memory card, based on the returned test pattern, and selects an encoding method requiring a maximum available bandwidth. The control circuit generates a notification message indicating the selected encoding method, and encodes the notification message using the selected encoding method, and transmit the encoded notification message to the memory card. The control circuit establishes communication between the host apparatus and the memory card, when receiving a response message including an acknowledgement to the notification message, from the memory card.

17 Claims, 20 Drawing Sheets

Fig.9

| ENCODING METHOD | MAXIMUM LENGTH WHERE BITS OF THE SAME LEVEL APPEAR CONSECUTIVELY | FREQUENCY COMPONENTS INCLUDED IN ENCODED BIT SEQUENCE | EFFECTIVE TRASMISSION RATE AFTER ENCODING |
|---|---|---|---|
| 8b/10b | 5 | $f_0/5 \sim f_0$ | 80% |
| 4b/6b | 4 | $f_0/4 \sim f_0$ | 67% |
| 2b/4b | 2 | $f_0/2 \sim f_0$ | 50% |

*Fig.14*

| SYMBOL | 8B | 10B | | FREQUENCY COMPONENTS INCLUDED IN ENCODED BIT SEQUENCE |
|---|---|---|---|---|
| | | RD− | RD+ | |
| D30.2 | 010 11110 | 011110 0101 | 100001 0101 | 0101 → $f_0$<br>1111, 0000 → $f_0/4$ |
| D13.3 | 011 01101 | 101100 1100 | 101100 0011 | 1100, 0011 → $f_0/2$ |
| D7.0 | 000 00111 | 111000 1011 | 000111 0100 | 111000, 000111 → $f_0/3$ |
| K28.1 | 001 11100 | 001111 1001 | 001111 1001 | 11111 → $f_0/5$ |

Fig.17

| TEST PATTERN | 0 1 | 0 0 1 1 | 0 0 0 1 1 1 | 0 0 0 0 1 1 1 1 | 0 0 0 0 0 1 1 1 1 1 |
|---|---|---|---|---|---|
| SUBPATTERN | F1 | F2 | F3 | F4 | F5 |
| FREQUENCY COMPONENT | $f_0$ | $f_0/2$ | $f_0/3$ | $f_0/4$ | $f_0/5$ |

PROXIMITY CONTACTLESS COMMUNICATION APPARATUS CAPABLE OF SELECTING APPROPRIATE ENCODING METHOD ACCORDING TO BANDWIDTH BETWEEN ANTENNAS

CROSS-REFERENCE TO RELATED applications

This is a continuation application of International Application No. PCT/JP2012/006360, with an international filing date of Oct. 3, 2012, which claims priority of Japanese Patent Application No. 2011-225588 filed on Oct. 13, 2011, the content of which is incorporated herein by reference.

BACKGROUND

1. Technical Field

The technical field relates to a proximity contactless communication apparatus for use in baseband proximity contactless communication through electromagnetic coupling between respective antennas of two communication apparatuses disposed close to each other. The present disclosure also relates to a proximity contactless communication system including such proximity contactless communication apparatuses, and relates to a proximity contactless communication method using such proximity contactless communication apparatuses.

2. Description of Related Art

In recent years, the transmission rate of high-speed digital interfaces has been increasing steadily. There are interfaces to be connected through a cable, such as USB 3.0 interface having a transmission rate of 5 Gbps, and S-ATA 3.0 (Serial ATA 3.0) interface having a transmission rate of 6 bps. There are interfaces for removable memory cards, such as UHS-II (Ultra High Speed Phase-II) interface for SD memory cards, having a transmission rate of 1.56 Gbps.

FIG. 22 is a schematic diagram showing a memory card 102 and a host apparatus 101 according to prior art. FIG. 23 is a diagram showing that the memory card 102 of FIG. 22 is inserted into a socket of the host apparatus 101. FIG. 24 is a cross-sectional view along a line A3-A4 of FIG. 23. The host apparatus 101 is provided with a circuit board 111, a communication circuit 112, transmission lines 113, and electrodes 114, as shown in FIG. 24. The memory card 102 has terminals P1 to P9 exposed on its surface, as shown in FIG. 22. In addition, the memory card 102 is provided with a circuit board 121, a communication circuit 122, a flash memory 123, transmission lines 124, and the electrodes P1 to P9, as shown in FIG. 24. Although FIG. 24 only shows the electrode P1 of the memory card 102 and the electrode 114 of the host apparatus 101 for ease of illustration, the other electrodes P2 to P9 of the memory card 102 and corresponding electrodes of the host apparatus 101 are also provided in a similar manner. When the memory card 102 is inserted into the host apparatus 101, the electrode P1 of the memory card 102 electrically contacts the electrode 114 of the host apparatus 101, and the communication circuit 112 of the host apparatus 101 is connected to the communication circuit 122 of the memory card 102, through the transmission line 113, the electrode 114, the electrode P1, and the transmission line 124.

The higher the transmission rate of an interface increases, the more significantly respective portions included in a signal transmission path affect signal quality. For example, electrical contacts included in the signal transmission path cause degradation in signal quality. In case of the memory card 102 and the host apparatus 101 of FIGS. 22 to 24, in particular, in a transmission path between the communication circuit 112 of the host apparatus 101 and the communication circuit 122 of the memory card 102, it is more difficult to design the characteristic impedances of the electrodes 114 and P1, than to design the characteristic impedances of the transmission lines 113 and 124. It results in a mismatch of characteristic impedance at a contact between the electrode P1 of the memory card 102 and the electrode 114 of the host apparatus 101, thus degrading signal quality.

In addition, since the electrodes P1 to P9 of the memory card 102 may contact with the human body, an I/O circuit (not shown) of the communication circuit 122 is connected to the electrodes P1 to P9 through electrostatic protection elements (not shown). Since each electrostatic protection element generally has a capacitive component of several pF, the characteristic impedance of this portion significantly decreases as compared to the characteristic impedances of other portions included in the signal transmission path, thus degrading signal quality.

Hence, in order to further increase the transmission rate of the interface for removable memory cards, as an alternative, it is proposed to use a high-speed digital interface using proximity contactless communication.

There are proximity contactless communication methods, such as: a method of transmitting a radio-frequency carrier wave modulated by a baseband digital data signal, such as Wi-Fi (wireless fidelity), (radio frequency proximity contactless communication); and a method of just transmitting a baseband digital data signal through electromagnetic coupling between two antennas disposed close to each other (baseband proximity contactless communication).

If using proximity contactless communication in order to increase the transmission rate of the interface for removable memory cards, it is desirable to use baseband proximity contactless communication. A carrier wave base clock source and a modulator circuit are required for radio frequency proximity contactless communication. On the other hand, a carrier wave base clock source and a modulator circuit are not required for baseband proximity contactless communication, and thus, there is a great advantage in terms of cost. Baseband proximity contactless communication can be implemented by connecting antennas to a communication circuit of a memory card and to a communication circuit of a host apparatus according to prior art, respectively, disposing the two antennas close to each other, and just transmitting a baseband digital data signal through electromagnetic coupling between the antennas. There is a communication system capable of baseband proximity contactless communication, such as an invention of Patent Literature 1.

CITATION LIST

Patent Literature

PATENT LITERATURE 1: Japanese Patent Laid-open Publication No. 2009-268022

SUMMARY

Technical Problem

When using electromagnetic coupling between two antennas disposed close to each other, a difference of several millimeters in distance between the antennas significantly affects a bandwidth and a transmission characteristic between the antennas.

In addition, when performing baseband proximity contactless communication, it is necessary to appropriately encode a digital data signal to be transmitted. A required bandwidth varies depending on the encoding method. When transmitting a digital data signal encoded using one encoding method, if the bandwidth between the antennas becomes lower than the required bandwidth due to a change in the distance between the antennas, then the transmission of the digital data signal fails.

The distance between the antenna of the memory card and the antenna of the host apparatus may change depending on the implementation of the host apparatus, and thus, the bandwidth between the antennas may also change. Therefore, proximity contactless communication apparatuses such as a memory card and a host apparatus capable of baseband proximity contactless communication need to select an appropriate encoding method according to a bandwidth between antennas.

One non-limiting and exemplary embodiment provides proximity contactless communication apparatuses for use in baseband proximity contactless communication, capable of establishing communication by selecting an appropriate encoding method according to a bandwidth between antennas. The present disclosure also provides a proximity contactless communication system including such proximity contactless communication apparatuses, and provides a proximity contactless communication method using such proximity contactless communication apparatuses.

Solution to Problem

According to a general aspect of the present disclosure, a proximity contactless communication apparatus which is a first communication apparatus of a proximity contactless communication system for baseband communication between the first communication apparatus and a second communication apparatus. The second communication apparatus is provided with at least one transmitting antenna and at least one receiving antenna. The proximity contactless communication apparatus is provided with: at least one transmitting antenna disposed close to the receiving antenna of the second communication apparatus; at least one receiving antenna disposed close to the transmitting antenna of the second communication apparatus; an encoder circuit configured to use a plurality of encoding methods requiring different bandwidths for transmission, respectively; a decoder circuit configured to use a plurality of decoding methods corresponding to the plurality of encoding methods; a test pattern generator circuit configured to generate test patterns; a comparator circuit configured to compare two test patterns; and a control circuit configured to perform a process for establishing communication between the proximity contactless communication apparatus and the second communication apparatus. The test patterns are generated to include a plurality of different frequency components when the test patterns are transmitted between the proximity contactless communication apparatus and the second communication apparatus, the plurality of different frequency components corresponding to the plurality of different bandwidths required by the plurality of encoding methods. In the process for establishing communication between the proximity contactless communication apparatus and the second communication apparatus, the control circuit is configured to: compare, by the comparator circuit, a test pattern generated by the test pattern generator circuit, with a test pattern transmitted to the second communication apparatus through the transmitting antenna of the proximity contactless communication apparatus and returned from the second communication apparatus through the receiving antenna of the proximity contactless communication apparatus; determine a bandwidth corresponding to frequency components correctly transmitted between the proximity contactless communication apparatus and the second communication apparatus, based on the returned test pattern, and select an encoding method requiring a maximum available bandwidth; generate a notification message indicating the selected encoding method, and encode the notification message by the encoder circuit using the selected encoding method, and transmit the encoded notification message to the second communication apparatus through the transmitting antenna of the proximity contactless communication apparatus; and establish communication between the proximity contactless communication apparatus and the second communication apparatus, when receiving a response message including an acknowledgement to the notification message, from the second communication apparatus, through the receiving antenna of the proximity contactless communication apparatus.

The general and specific aspects may be implemented using a system, a method, and a computer program, and any combination of systems, methods, and computer programs.

Advantageous Effects of Invention

According to the present disclosure, it is possible to establish communication by selecting an appropriate encoding method according to a bandwidth between the antennas of the first and second communication apparatuses, for baseband proximity contactless communication between the antennas of the first and second communication apparatuses.

Additional benefits and advantages of the disclosed embodiments will be apparent from the specification and drawings. The benefits and/or advantages may be individually provided by the various embodiments and features of the specification and drawings disclosure, and need not all be provided in order to obtain one or more of the same.

BRIEF DESCRIPTION OF DRAWINGS

FIG. 9 is a table in which features of the encoding methods are compared with each other.

FIG. 14 is a diagram showing an exemplary test pattern used by the 8b/10b encoding method.

FIG. 17 is a diagram showing a first example of a test pattern generated at step S43 of FIG. 16.

DETAILED DESCRIPTION

Embodiments of proximity contactless communication systems will be described below with reference to the drawings. The similar components are denoted by the same reference signs throughout the drawings.

First Embodiment

Figure 1:
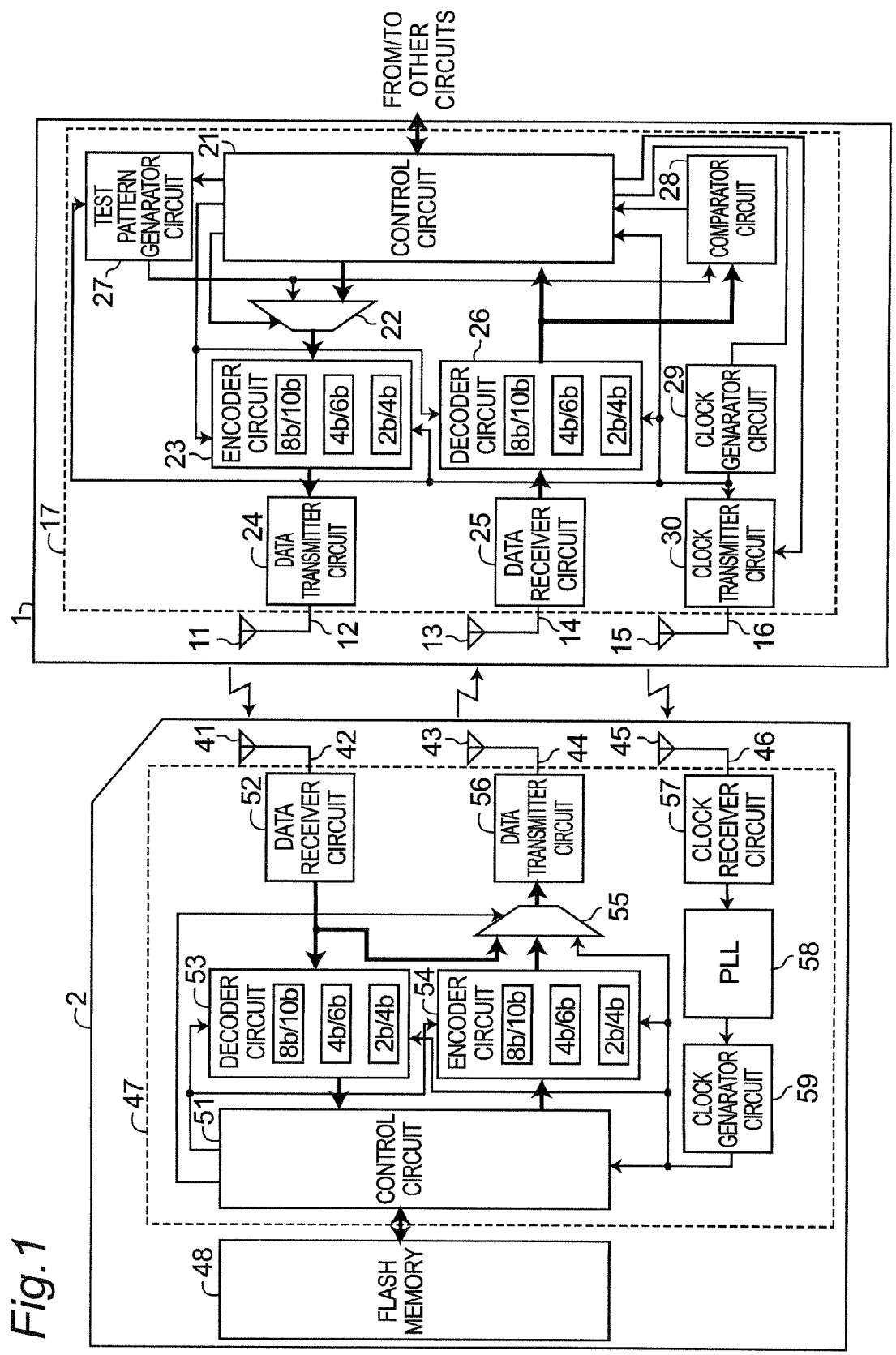
FIG. 1 is a block diagram showing a configuration of a proximity contactless communication system according to a first embodiment.

FIG. 1 is a block diagram showing a configuration of a proximity contactless communication system according to a first embodiment. The proximity contactless communication system includes two proximity contactless communication apparatuses, i.e., a memory card 2, and a host apparatus 1 having a socket into which the memory card 2 is inserted. The host apparatus 1 and the memory card 2 are provided with antennas, respectively, which are disposed close to each other, and perform baseband proximity contactless communication through electromagnetic coupling between the antennas. The host apparatus 1 is a memory card reader, or other apparatuses such as a personal computer having a socket for the memory card 2. FIG. 1 only shows the configurations of portions necessary to describe the embodiment, and the configurations of other portions are omitted.

The host apparatus 1 is configured as follows.

The host apparatus 1 is provided with a transmitting antenna 11, a receiving antenna 13, a transmitting antenna 15, and a communication circuit 17. The transmitting antenna 11, the receiving antenna 13, and the transmitting antenna 15 are connected to the communication circuit 17 through transmission lines 12, 14, and 16, respectively. In addition, the transmitting antenna 11, the receiving antenna 13, and the transmitting antenna 15 are disposed close to a receiving antenna 41, a transmitting antenna 43, and a receiving antenna 45 of the memory card 2, which will be described later, so as to be electromagnetically coupled to the antennas 41, 43, and 45, respectively.

The communication circuit 17 is provided with a control circuit 21, a selector 22, an encoder circuit 23, a data transmitter circuit 24, a data receiver circuit 25, a decoder circuit 26, a test pattern generator circuit 27, a comparator circuit 28, a clock generator circuit 29, and a clock transmitter circuit 30.

When the memory card 2 is inserted into the socket of the host apparatus 1, the control circuit 21 performs a communication establishment process, which will be described later with reference to FIG. 10, to establish communication between the host apparatus 1 and the memory card 2. The test pattern generator circuit 27 generates test patterns for the communication establishment process under the control of the control circuit 21.

The encoder circuit 23 encodes an inputted signal using a plurality of encoding methods requiring different bandwidths for transmission, respectively. The encoding methods include, for example, the 8b/10b encoding method, the 4b/6b encoding method, and the 2b/4b encoding method. The decoder circuit 26 decodes an inputted signal using a plurality of decoding methods corresponding to the plurality of encoding methods used by the encoder circuit 23, i.e., using the 8b/10b decoding method, the 4b/6b decoding method, and the 2b/4b decoding method. The encoder circuit 23 selects one of the plurality of encoding methods under the control of the control circuit 21. The decoder circuit 26 selects a decoding method corresponding to the selected encoding method under the control of the control circuit 21.

The data transmitter circuit 24 transmits in baseband the signal encoded by the encoder circuit 23, to the receiving antenna 41 of the memory card 2, through the transmission line 12 and the transmitting antenna 11.

The data receiver circuit 25 receives a signal in baseband from the transmitting antenna 43 of the memory card 2 through the receiving antenna 13 and the transmission line 14, and sends the signal to the decoder circuit 26.

The comparator circuit 28 compares a test pattern generated by the test pattern generator circuit 27, with a test pattern transmitted to the memory card 2 through the transmitting antenna 11 and returned from the memory card 2 through the receiving antenna 13 and decoded by the decoder circuit 26. Then, the comparator circuit 28 sends a comparison result to the control circuit 21.

The control circuit 21 is connected to other circuits (not shown) for obtaining a data signal to be written to the memory card 2, and for processing a data signal read from the memory card 2. The control circuit 21 adds Cyclic Redundancy Checksum (CRC) information, etc., to a data signal sent from other circuits, and sends the data signal to the selector 22. The control circuit 21 controls the selector 22 to send one of the test pattern generated by the test pattern generator circuit 27, and the data signal sent from other circuits, to the encoder circuit 23. In addition, the control circuit 21 sends a data signal sent from the decoder circuit 26 (i.e., a data signal read from the memory card 2), to other circuits. When a data signal is sent from the decoder circuit 26, the control circuit 21 checks CRC information of the data signal to determine whether or not communication errors occur.

The clock generator circuit 29 generates a clock signal of the host apparatus 1 under the control of the control circuit 21. The generated clock signal of the host apparatus 1 is sent to the control circuit 21, the encoder circuit 23, the decoder circuit 26, the test pattern generator circuit 27, and the clock transmitter circuit 30. The clock signal may be further sent to the data transmitter circuit 24 and the data receiver circuit 25.

The clock transmitter circuit 30 sends in baseband the clock signal of the host apparatus 1 to the receiving antenna 45 of the memory card 2 through the transmission line 16 and the transmitting antenna 15, under the control of the control circuit 21.

The memory card 2 is configured as follows.

The memory card 2 is provided with the receiving antenna 41, the transmitting antenna 43, the receiving antenna 45, a communication circuit 47, and a flash memory 48. The receiving antenna 41, the transmitting antenna 43, and the receiving antenna 45 are connected to the communication circuit 47 through transmission lines 42, 44, and 46, respectively. In addition, the receiving antenna 41, the transmitting antenna 43, and the receiving antenna 45 are disposed close to the transmitting antenna 11, the receiving antenna 13, and the transmitting antenna 15 of the host apparatus 1, so as to be electromagnetically coupled to the antennas 11, 13, and 15, respectively.

The communication circuit 47 is provided with a control circuit 51, a data receiver circuit 52, a decoder circuit 53, an encoder circuit 54, a selector 55, a data transmitter circuit 56, a clock receiver circuit 57, a phase-locked loop circuit (PLL) 58, and a clock generator circuit 59.

When the memory card 2 is inserted into the socket of the host apparatus 1, the control circuit 51 performs a communication establishment process, which will be described later with reference to FIG. 13, to establish communication between the host apparatus 1 and the memory card 2.

The data receiver circuit 52 receives a signal in baseband from the transmitting antenna 11 of the host apparatus 1 through the receiving antenna 41 and the transmission line 42, and sends the signal to both the decoder circuit 53 and the selector 55.

The decoder circuit 53 decodes the inputted signal using a plurality of decoding methods corresponding to the plurality of encoding methods used by the encoder circuit 23 of the host apparatus 1, i.e., using the 8b/10b decoding method, the 4b/6b decoding method, and the 2b/4b decoding method. The encoder circuit 54 encodes an inputted signal using the same plurality of encoding methods as those used by the encoder circuit 23 of the host apparatus 1, i.e., using the 8b/10b encoding method, the 4b/6b encoding method, and the 2b/4b encoding method. The decoder circuit 53 selects one of the plurality of decoding methods under the control of the control circuit 51. The encoder circuit 54 selects an encoding method corresponding to the selected decoding method under the control of the control circuit 51.

The clock receiver circuit 57 receives in baseband a clock signal of the host apparatus 1, from the transmitting antenna 15 of the host apparatus 1, through the receiving antenna 45 and the transmission line 46. The PLL 58 and the clock generator circuit 59 generate a clock signal of the memory card 2, based on the clock signal of the host apparatus 1. The generated clock signal of the memory card 2 is sent to the control circuit 51, the decoder circuit 53, the encoder circuit 54, and the selector 55. The clock signal may be further sent to the data receiver circuit 52 and the data transmitter circuit 56.

The control circuit 51 writes a data signal sent from the host apparatus 1, to the flash memory 48, and also sends a data signal read from the flash memory 48, to the host apparatus 1. When a data signal is sent from the decoder circuit 53 (i.e., when a data signal is sent from the host apparatus 1), the control circuit 51 checks CRC information of the data signal to determine whether or not communication errors occur. The control circuit 51 adds CRC information, etc., to a data signal read from the flash memory 48, and sends the data signal to the encoder circuit 54.

The control circuit 51 controls the selector 55 to send one of an output signal of the data receiver circuit 52, an output signal of the encoder circuit 54, and the clock signal of the memory card 2, to the data transmitter circuit 56. When the output signal of the data receiver circuit 52 is sent to the data transmitter circuit 56, a signal received from the host apparatus 1 is substantially just returned to the host apparatus 1 (loopback).

The data transmitter circuit 56 sends in baseband the output signal of the selector 55 to the receiving antenna 13 of the host apparatus 1 through the transmission line 44 and the transmitting antenna 43.

Since the proximity contactless communication system of FIG. 1 is configured as described above, it is possible to perform baseband proximity contactless communication between the antennas of the host apparatus 1 and the memory card 2.

The host apparatus 1 and the memory card 2 of FIG. 1 is provided with electrodes for power supply from the host apparatus 1 to the memory card 2. The electrodes can be used, because it is not necessary to achieve characteristic impedance matching for power supply. As an alternative to electrodes, the host apparatus 1 and the memory card 2 may be provided with coils, respectively, for contactless power transmission through electromagnetic coupling between the coils.

Figure 2:
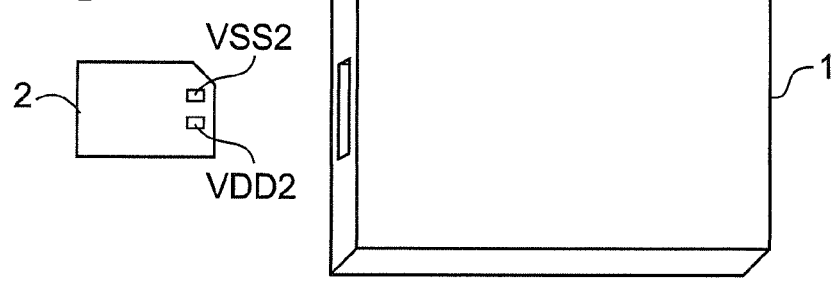
FIG. 2 is a schematic diagram showing a proximity contactless communication system according to a first implementation example of the first embodiment.
Figure 3:
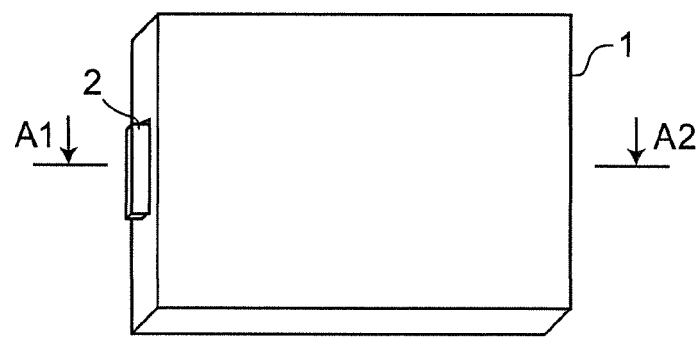
FIG. 3 is a diagram showing that a memory card 2 of FIG. 2 is inserted into a socket of a host apparatus 1.
Figure 4:
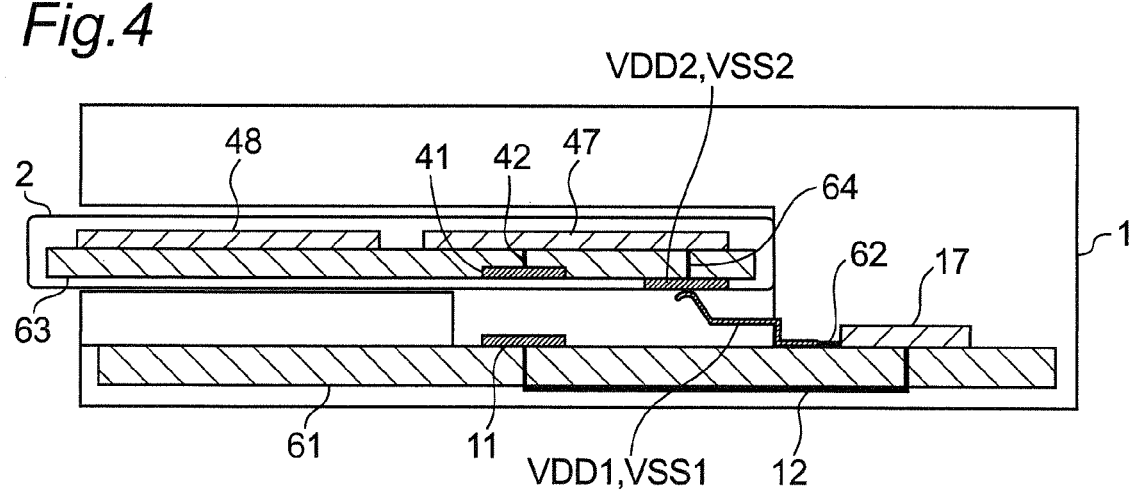
FIG. 4 is a cross-sectional view along a line A1-A2 of FIG. 3.
Figure 22:
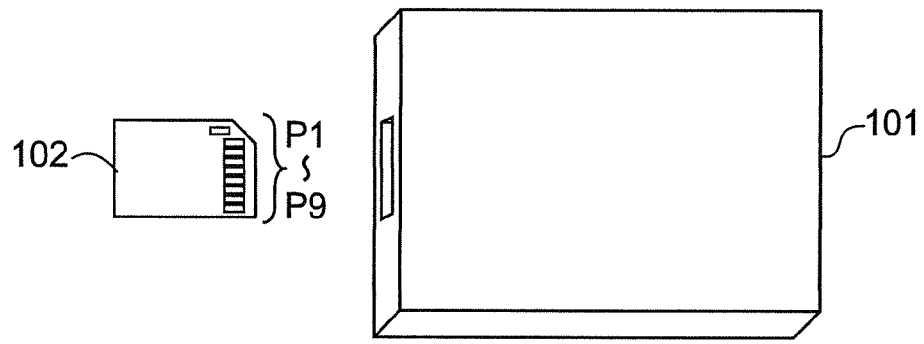
FIG. 22 is a schematic diagram showing a memory card 102 and a host apparatus 101 according to prior art.
Figure 23:
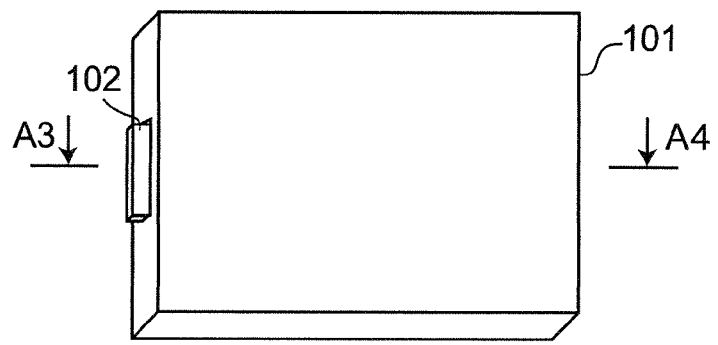
FIG. 23 is a diagram showing that the memory card 102 of FIG. 22 is inserted into a socket of the host apparatus 101.
Figure 24:
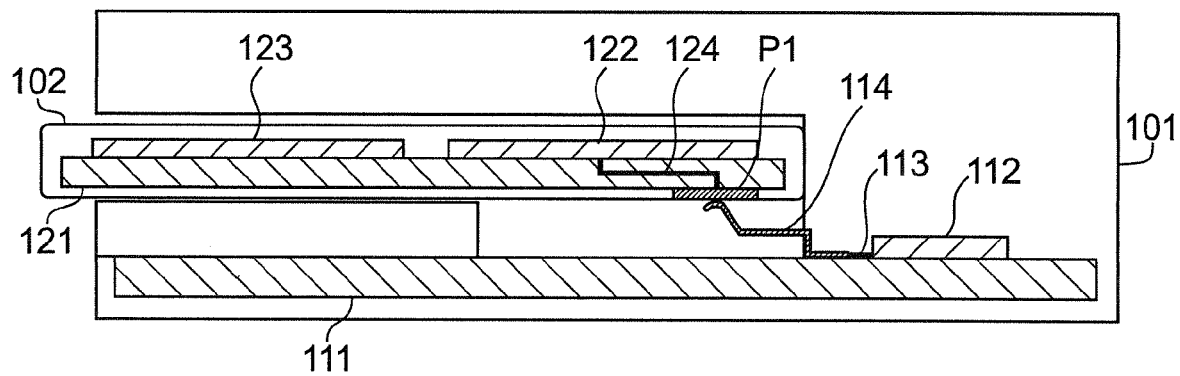
FIG. 24 is a cross-sectional view along a line A3-A4 of FIG. 23.

FIG. 2 is a schematic diagram showing a proximity contactless communication system according to a first implementation example of the first embodiment. FIG. 3 is a diagram showing that a memory card 2 of FIG. 2 is inserted into a socket of a host apparatus 1. FIG. 4 is a cross-sectional view along a line A1-A2 of FIG. 3. The host apparatus 1 of FIG. 2 is provided with a circuit board 61, and the same components as those of the host apparatus 1 of FIG. 1 (i.e., a transmitting antenna 11, a receiving antenna 13, a transmitting antenna 15, transmission lines 12, 14, and 16, and a communication circuit 17) which are provided on the circuit board 61, and is further provided with electrodes VDD1 and VSS1 and a power line 62 which are provided on the circuit board 61. The memory card 2 of FIG. 2 is provided with a circuit board 63, and the same components as those of the memory card 2 of FIG. 1 (i.e., a receiving antenna 41, a transmitting antenna 43, a receiving antenna 45, transmission lines 42, 44, and 46, a communication circuit 47, and a flash memory 48) which are provided on the circuit board 63, and is further provided with electrodes VDD2 and VSS2 and a power line 64 which are provided on the circuit board 63. The receiving antenna 41, the transmitting antenna 43, and the receiving antenna 45 of the memory card 2 are disposed close to the transmitting antenna 11, the receiving antenna 13, and the transmitting antenna 15 of the host apparatus 1, so as to be electromagnetically coupled to the antennas 11, 13, and 15, respectively. In FIG. 4, for ease of illustration, the receiving antenna 13, the transmitting antenna 15, and the transmission lines 14 and 16 of the host apparatus 1, and the transmitting antenna 43, the receiving antenna 45, and the transmission lines 44 and 46 of the memory card 2 are omitted. The host apparatus 1 of FIG. 2 is not provided with an electrode for transmitting data signals, but provided with only the electrodes VDD1 and VSS1 for power supply. Also, the memory card 2 of FIG. 2 is not provided with an electrode for transmitting data signals, but provided with only the electrodes VDD2 and VSS2 for power supply. Since the proximity contactless communication system of FIGS. 2 to 4 performs baseband proximity contactless communication, it is not necessary to use a contact between an electrode 114 of a host apparatus 101 and an electrode P1 of a memory card 102 as shown in FIGS. 22 to 24, and therefore, it is possible to avoid the mismatch of characteristic impedance at the contact. Further, since it is not necessary to connect electrostatic protection elements to electrodes, it is possible to avoid a reduction in characteristic impedance due to the capacitive components of the electrostatic protection elements.

Figure 5:
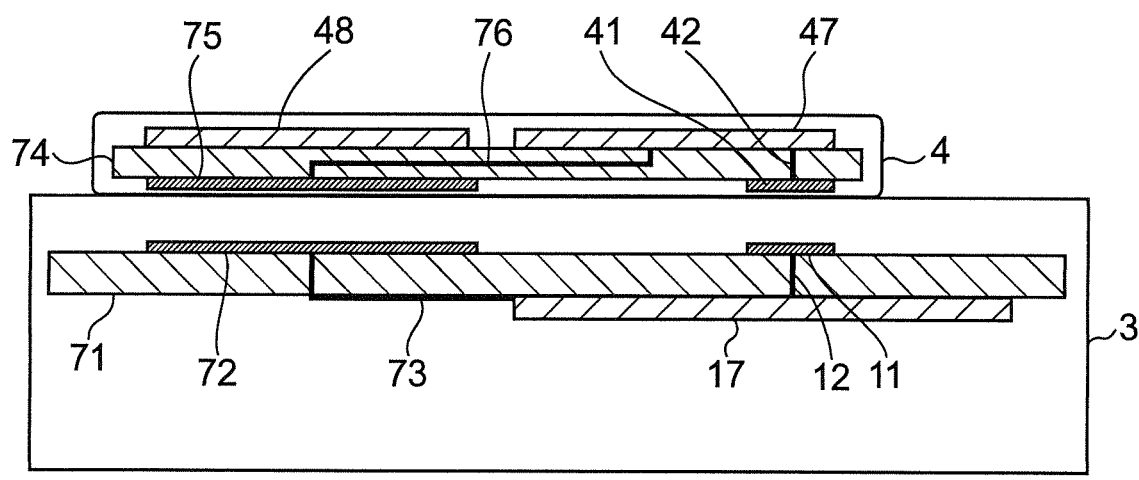
FIG. 5 is a schematic diagram showing a proximity contactless communication system according to a second implementation example of the first embodiment.

FIG. 5 is a schematic diagram showing a proximity contactless communication system according to a second implementation example of the first embodiment. The proximity contactless communication system of FIG. 5 includes a host apparatus 3 and a mobile apparatus 4. The mobile apparatus 4 performs baseband proximity contactless communication with the host apparatus 3, when the mobile apparatus 4 is placed on the host apparatus 3, or when the mobile apparatus 4 approaches to a top surface of the host apparatus 3. The mobile apparatus 4 may be an apparatus containing therein the memory card 2 of FIG. 1. The host apparatus 3 of FIG. 5 is provided with a circuit board 71, and the same components as those of the host apparatus 1 of FIG. 1 (i.e., a transmitting antenna 11, a receiving antenna 13, a transmitting antenna 15, transmission lines 12, 14, and 16, and a communication circuit 17) which are provided on the circuit board 71, and is further provided with a power transmitting coil 72 and a power line 73 which are provided on the circuit board 71. The mobile apparatus 4 of FIG. 5 is provided with a circuit board 74, and the same components as those of the memory card 2 of FIG. 1 (i.e., a receiving antenna 41, a transmitting antenna 43, a receiving antenna 45, transmission lines 42, 44, and 46, a communication circuit 47, and a flash memory 48) which are provided on the circuit board 74, and is further provided with a power receiving coil 75 and a power line 76 which are provided on the circuit board 74. The receiving antenna 41, the transmitting antenna 43, and the receiving antenna 45 of the mobile apparatus 4 are disposed close to the transmitting antenna 11, the receiving antenna 13, and the transmitting antenna 15 of the host apparatus 3, so as to be electromagnetically coupled to the antennas 11, 13, and 15, respectively. In FIG. 5, for ease of illustration, the receiving antenna 13, the transmitting antenna 15, and the transmission lines 14 and 16 of the host apparatus 3, and the transmitting antenna 43, the receiving antenna 45, and the transmission lines 44 and 46 of the mobile apparatus 4 are omitted. The host apparatus 3 and the mobile apparatus 4 can perform baseband proximity contactless communication, and in addition, achieve contactless power transmission through electromagnetic coupling between the power transmitting coil 72 and the power receiving coil 75.

As shown in the proximity contactless communication system of FIGS. 2 to 4 and the proximity contactless communication system of FIG. 5, the distance between the transmitting antenna and the receiving antenna may change depending on the implementation of the proximity contactless communication system. Further, as shown in the proximity contactless communication system of FIG. 5, the dielectric constant between the transmitting antenna and the receiving antenna changes according to the housings of the host apparatus 3 and the mobile apparatus 4. Due to these factors, the bandwidth between the antennas may also change.

Figure 6:
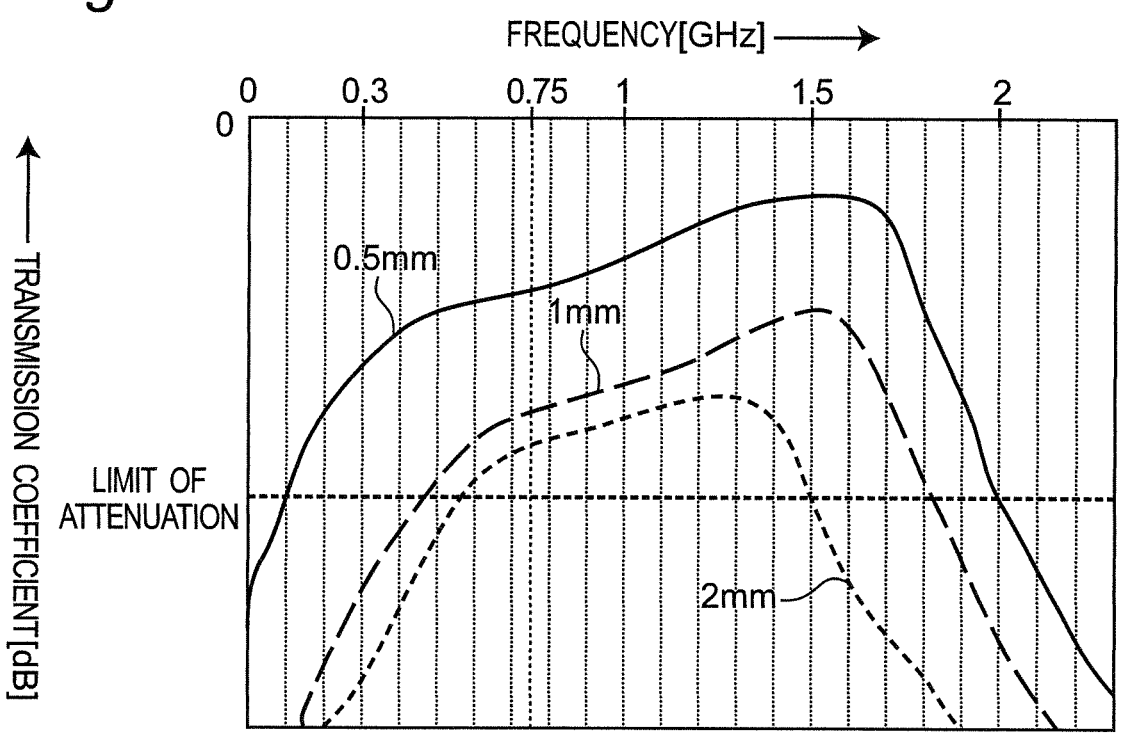
FIG. 6 is a diagram showing transmission characteristics between the antennas, with respect to the distances between antennas.

FIG. 6 is a diagram showing transmission characteristics between the antennas, with respect to the distances between antennas. FIG. 6 shows exemplary characteristics of the transmission coefficient versus frequency, obtained when an exemplary transmitting antenna and receiving antenna are disposed at a distance of 0.5 mm, 1 mm, and 2 mm. As shown in FIG. 6, even a difference of several millimeters in distance between the transmitting antenna and the receiving antenna significantly changes the transmission characteristic between the antennas.

It is assumed that the clock frequency $f_0$ of the host apparatus 1 and the memory card 2 is 1.5 GHz. The "limit of attenuation" on the vertical axis of FIG. 6 indicates the acceptable limit for the attenuation of the amplitude of a signal, the signal being transmitted from the data transmitter circuit 24 to the data receiver circuit 52, or from the data transmitter circuit 56 to the data receiver circuit 25. For example, assuming that the amplitude of output signals from the data transmitter circuits 24 and 56 is 300 mV, and the minimum value of the amplitude of input signals to the data receiver circuits 52 and 25 is 100 mV, the limit of attenuation is: 20×log (100 mV/300 mV)=−10 dB. Therefore, a bandwidth including only frequency components having a higher transmission coefficient than the "limit of attenuation" of FIG. 6 is available as the "bandwidth between the antennas".

According to FIG. 6, the bandwidth is wide when the distance between the antennas is 0.5 mm, and on the other hand, the bandwidth is much narrower when the distance is 2 mm.

Meanwhile, an original digital data signal (bit pattern) to be transmitted between the host apparatus 1 and the memory card 2 has a bandwidth from $f_0$ [Hz] (when the data signal is 0101 . . . ) to 0 [Hz] (when the data signal is 0000 . . . or 1111 . . . ), where $f_0$ denotes the clock frequency of the host apparatus 1 and the memory card 2. When transmitting an actual signal between the host apparatus 1 and the memory card 2, it is necessary to limit the bandwidth of a signal to be transmitted. Further, it is necessary to suppress Inter Symbol Interference (ISI) which occurs, for example, when only one bit of "1" (or "0") appears after long consecutive bits of the same "0" (or "1"). Therefore, in high-speed digital interfaces, it is common to transmit a digital data signal encoded using the 8*b*/10*b* encoding method, etc., through a transmission line.

In a signal encoded using the 8*b*/10*b* encoding method, the maximum length of consecutive bits of the same level (0 or 1) is 5 bits. Hence, the frequency components included in a signal encoded using the 8*b*/10*b* encoding method are $f_0$, $f_0/2$, $f_0/3$, $f_0/4$, and $f_0/5$. The details of 8*b*/10*b* encoding are known as prior art.

In addition, in a signal encoded using the 4*b*/6*b* encoding method, the maximum length of consecutive bits of the same level (0 or 1) is 4 bits. Hence, the frequency components included in a signal encoded using the 4*b*/6*b* encoding method are $f_0$, $f_0/2$, $f_0/3$, and $f_0/4$. The details of the 4*b*/6*b* encoding method are known as prior art.

Figure 8:
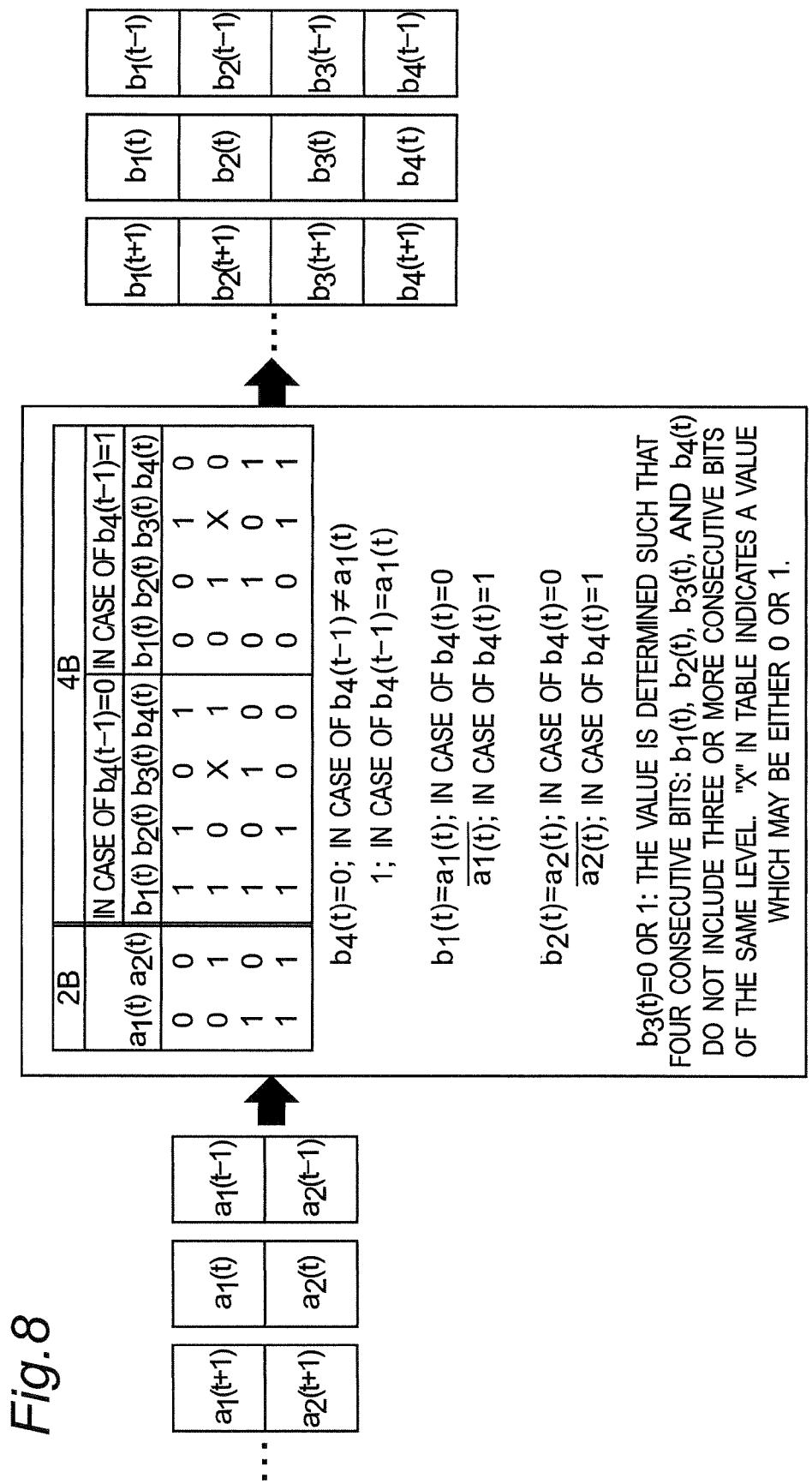
FIG. 8 is a diagram describing an exemplary 2b/4b encoding method.

In addition, in a signal encoded using the 2*b*/4*b* encoding method, the maximum length of consecutive bits of the same level (0 or 1) is 2 bits. Hence, the frequency components included in a signal encoded using the 2*b*/4*b* encoding method are $f_0$ and $f_0/2$. The details of 2*b*/4*b* encoding method are known as prior art. FIG. 8 is a diagram describing an exemplary 2*b*/4*b* encoding method.

FIG. 9 is a table in which features of the encoding methods are compared with each other. As shown in FIG. 9, the 4*b*/6*b* encoding method has a better transmission efficiency than that of the 2*b*/4*b* encoding method, and 8*b*/10*b* encoding has a better transmission efficiency than that of the 4*b*/6*b* encoding method. However, since extra bits are added to an original data signal by encoding, the effective transmission rates decrease as shown in FIG. 9.

Figure 7:
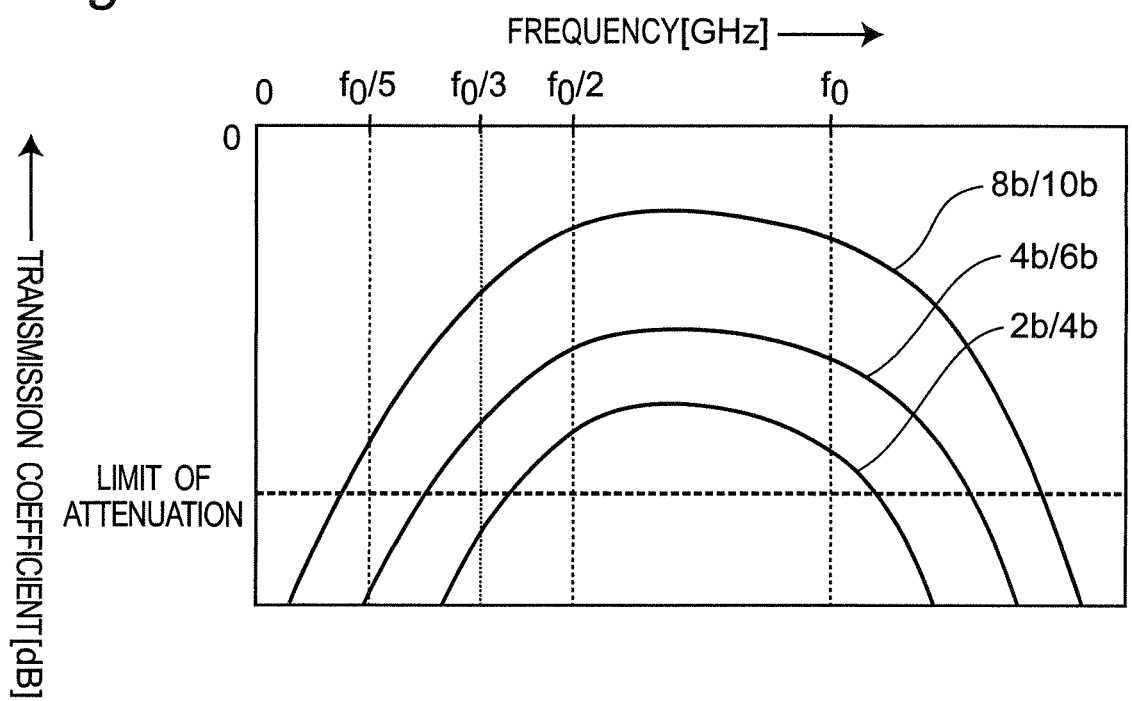
FIG. 7 is a diagram showing transmission characteristics between the antennas, with respect to encoding methods.

FIG. 7 is a diagram showing transmission characteristics between the antennas, with respect to encoding methods. FIG. 7 shows exemplary characteristics of the transmission coefficient versus frequency, obtained when the 8*b*/10*b* encoding method, the 4b/6b encoding method, and the 2b/4b encoding method are used. When a signal encoded using one of these encoding methods is transmitted in baseband between the antennas of the host apparatus 1 and the memory card 2, the transmitted signal includes the above-described plurality of frequency components: $f_0$ to $f_0/5$; or $f_0$ to $f_0/4$; or $f_0$ to $f_0/2$, depending on the encoding method. The respective encoding methods require different bandwidths corresponding to these frequency components. A bandwidth including only frequency components having higher transmission coefficients than the "limit of attenuation" of FIG. 7 is a "bandwidth required by each encoding method". In case of using the 4b/6b encoding method, a wider bandwidth is required than that of the 2b/4b encoding method. In case of using the 8b/10b encoding method, a wider bandwidth is required than that of the 4b/6b encoding method.

In order to perform baseband proximity contactless communication when the distance between the antennas is one of 0.5 mm, 1 mm, and 2 mm, the "bandwidth required by an encoding method" should be within the "bandwidth between the antennas".

For example, when the distance between the antennas is 0.5 mm, the available band is 100 MHz to 2 GHz. When $f_0=1.5$ GHz, $f_0/5=300$ MHz, and thus, all of the 8b/10b encoding method, the 4b/6b encoding method, and the 2b/4b encoding method can be used. In this case, it is preferable to select the 8b/10b encoding method from the point of view of the effective transmission rate. On the other hand, when the distance between the antennas is 1 mm, the available band is 500 MHz to 1.8 GHz. In this case, since $f_0/5=300$ MHz, the frequency component of $f_0/5$ cannot be transmitted, and thus, the 8b/10b encoding method cannot be used, but the 4b/6b encoding method can be used.

Thus, according to baseband proximity contactless communication of the present embodiment, an encoding method is selected based on the bandwidth between the antennas of the host apparatus 1 and the memory card 2.

With reference to FIGS. 10 to 13, communication establishment processes performed when the memory card 2 is inserted into the socket of the host apparatus 1 will be described below.

Figure 10:
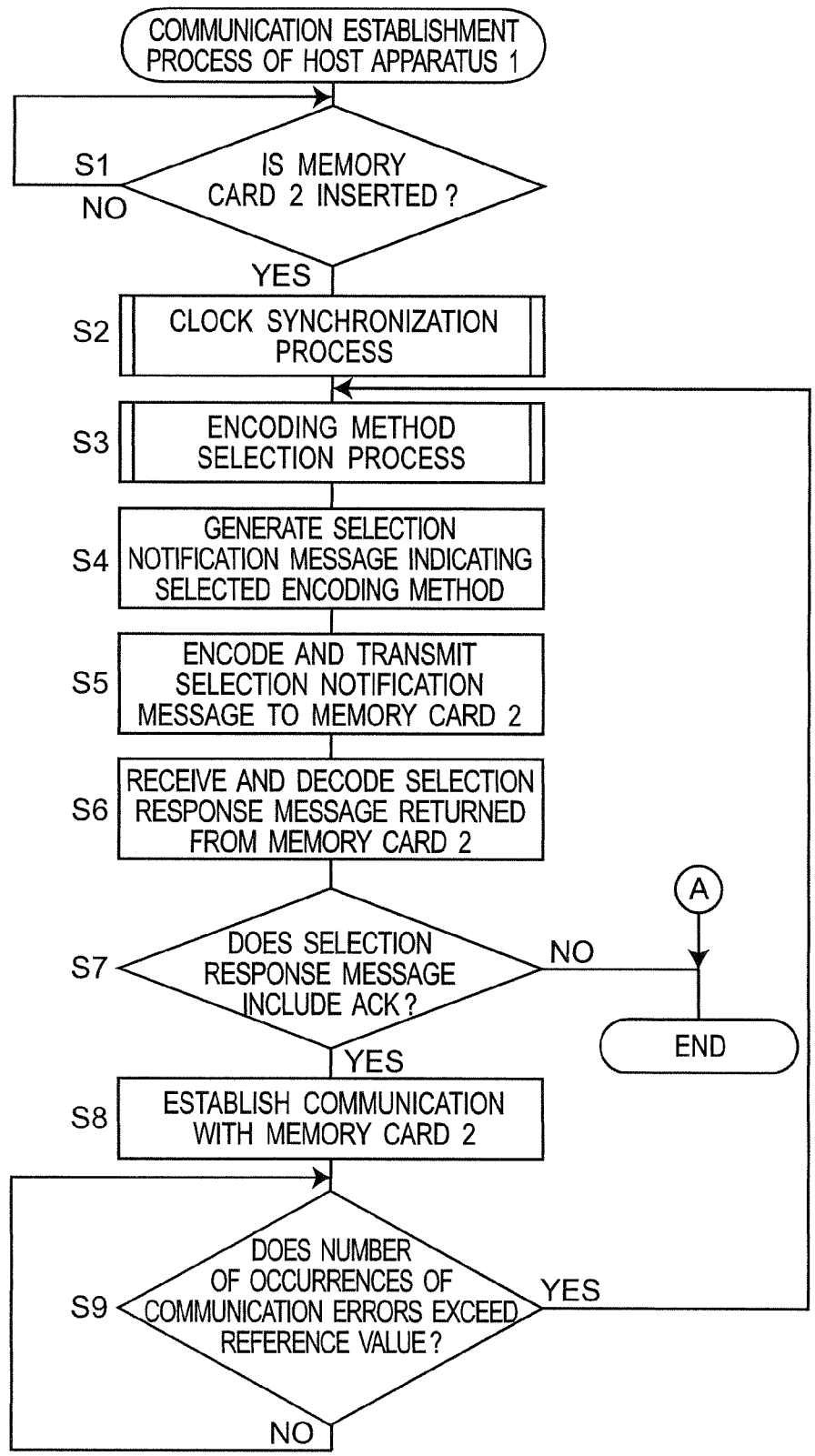
FIG. 10 is a flowchart showing a communication establishment process of the host apparatus 1, which is performed by a control circuit 21 of the host apparatus 1 of FIG. 1.

FIG. 10 is a flowchart showing a communication establishment process of the host apparatus 1, which is performed by the control circuit 21 of the host apparatus 1 of FIG. 1. FIG. 13 is a flowchart showing a communication establishment process of the memory card 2, which is performed by the control circuit 51 of the memory card 2 of FIG. 1. According to the communication establishment process, an encoding method is selected based on the bandwidth between the antennas of the host apparatus 1 and the memory card 2, to establish communication between the host apparatus 1 and the memory card 2.

At step S1 of FIG. 10, the control circuit 21 of the host apparatus 1 determines whether or not the memory card 2 is inserted; if YES, then the control circuit 21 performs a clock synchronization process at step S2, and sends a clock signal of the host apparatus 1 to the memory card 2. On the other hand, at step S31 of FIG. 13, when the control circuit 51 of the memory card 2 receives the clock signal of the host apparatus 1, the control circuit 51 performs a clock synchronization process. In the clock synchronization process, the clock signal of the host apparatus 1 is synchronized with a clock signal of the memory card 2. The details of the clock synchronization process will be described later with reference to FIGS. 19 to 21. At step S32 of FIG. 13, the control circuit 51 of the memory card 2 sets the selector 55 to send an output signal of the data receiver circuit 52 to the data transmitter circuit 56.

Then, at step S3 of FIG. 10, the control circuit 21 of the host apparatus 1 performs an encoding method selection process. At this step S3, the control circuit 21 encodes a predetermined test pattern by the encoder circuit 23 using one of a plurality of encoding methods, transmits the encoded test pattern to the memory card 2, and selects one of the encoding methods based on a test pattern returned from the memory card 2.

Figure 11:
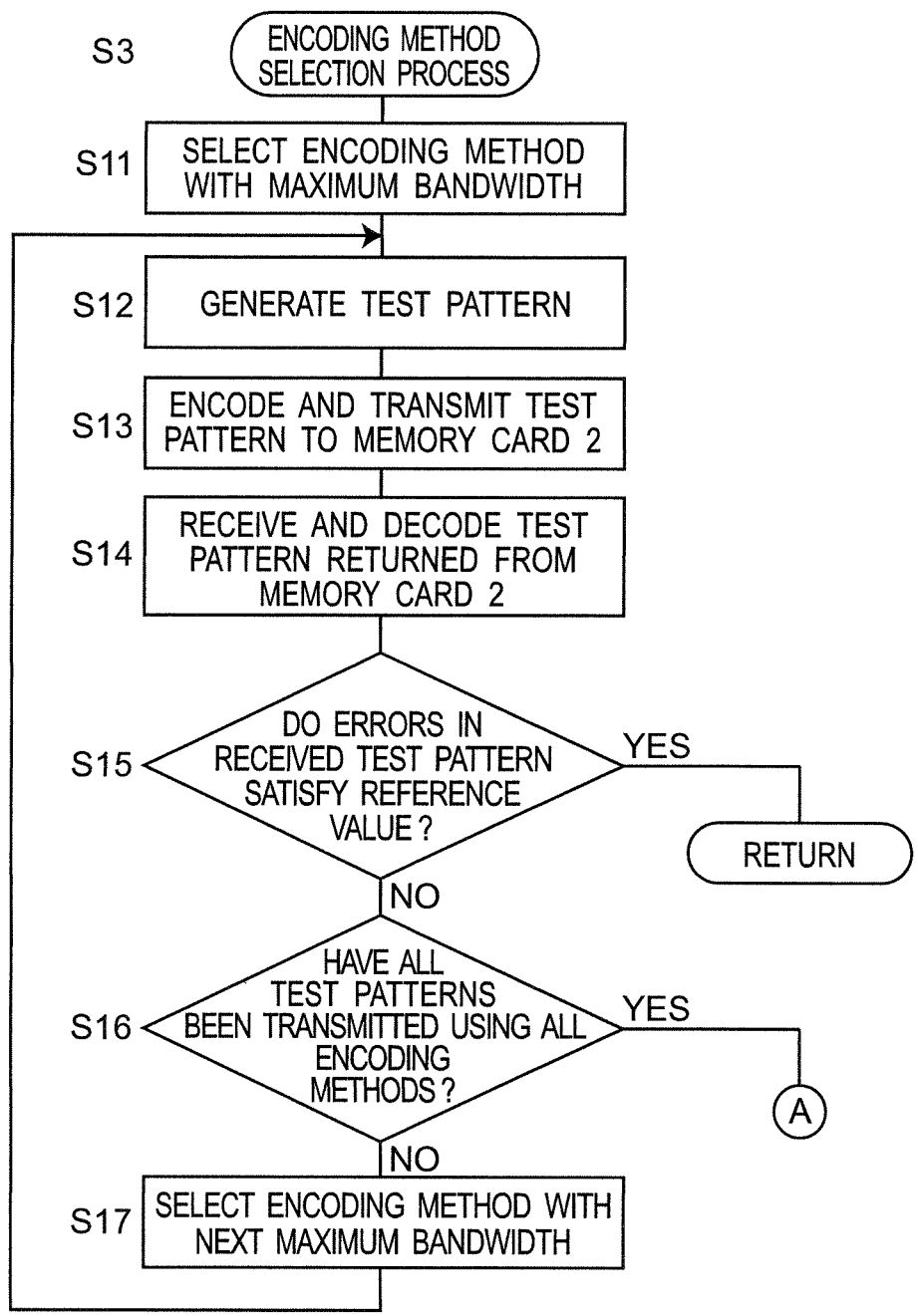
FIG. 11 is a flowchart showing an encoding method selection process S3 as a subroutine of FIG. 10.

FIG. 11 is a flowchart showing an encoding method selection process S3 as a subroutine of FIG. 10. At step S11 of FIG. 11, the control circuit 21 of the host apparatus 1 selects an encoding method with the maximum bandwidth. When performing baseband proximity contactless communication at a very short distance between the antennas of the host apparatus 1 and the memory card 2, it can expected that the transmission coefficient between the antennas is higher than the limit of attenuation over a wide band. Therefore, when the encoder circuit 23 encodes the test pattern, the control circuit 21 changes over the plurality of encoding methods in descending order of required bandwidth, i.e., in order of the 8b/10b encoding method, the 4b/6b encoding method, and the 2b/4b encoding method. Thus, it is possible to establish communication using an encoding method having a high effective transmission rate in a short time.

Then, at step S12, the control circuit 21 of the host apparatus 1 generates a test pattern using the test pattern generator circuit 27. The test patterns are generated so as to include a plurality of different frequency components corresponding to a plurality of different bandwidths which are required by the plurality of encoding methods, when the test patterns are transmitted between the host apparatus 1 and the memory card 2 (i.e., after the test patterns are encoded by the encoder circuit 23). In other words, a test pattern is generated so as to include all frequency components required by a selected encoding method, when the test pattern is encoded using the encoding method. Therefore, the test pattern generator circuit 27 generates different test patterns according to the encoding method selected at step S11.

FIG. 14 is a diagram showing an exemplary test pattern used by the 8b/10b encoding method. According to the 8b/10b encoding method, the frequency components potentially included in an encoded bit sequence are: $f_0$, $f_0/2$, $f_0/3$, $f_0/4$, and $f_0/5$. Therefore, a test pattern may be generated such that an encoded test pattern includes these frequency components, and thus, a test pattern including, for example, symbols D30.2, D13.3, D7.0, and K28.1 shown in FIG. 14 may be generated.

Similarly, according to the 4b/6b encoding method, the frequency components potentially included in an encoded bit sequence are: $f_0$, $f_0/2$, $f_0/3$, and $f_0/4$. Therefore, the test pattern generator circuit 27 generates a test pattern such that an encoded test pattern includes these frequency components.

In the 2b/4b encoding method, the frequency components potentially included in an encoded bit sequence are: $f_0$ and $f_0/2$. Therefore, the test pattern generator circuit 27 generates a test pattern such that an encoded test pattern includes these frequency components.

At step S13 of FIG. 11, the control circuit 21 of the host apparatus 1 sends the generated test pattern to the encoder circuit 23 through the selector 22. The encoder circuit 23 encodes the test pattern using the selected encoding method. Then, the data transmitter circuit 24 transmits the encoded test pattern to the memory card 2 through the transmission line 12 and the transmitting antenna 11.

The data receiver circuit 52 of the memory card 2 receives the test pattern transmitted from the host apparatus 1, through the receiving antenna 41 and the transmission line 42. As described above, the selector 55 of the memory card 2 is set to send an output signal of the data receiver circuit 52 to the data transmitter circuit 56 (step S32 of FIG. 13). Therefore, the data receiver circuit 52 sends the received test pattern to the data transmitter circuit 56 through the selector 55. The data transmitter circuit 56 returns the test pattern to the host apparatus 1 through the transmission line 44 and the transmitting antenna 43.

At step S14 of FIG. 11, the data receiver circuit 25 of the host apparatus 1 receives the test pattern returned from the memory card 2 through the receiving antenna 13 and the transmission line 14, and the decoder circuit 26 decodes the returned test pattern using a decoding method corresponding to the selected encoding method. The decoded test pattern is sent to the comparator circuit 28. The comparator circuit 28 compares the test pattern generated by the test pattern generator circuit 27, with the test pattern returned from the memory card 2 and decoded, and sends a comparison result to the control circuit 21. The comparison result indicates errors in the returned test pattern. At this time, if all the frequency components included in the encoded test pattern are within the "bandwidth between the antennas", then the test pattern generated by the test pattern generator circuit 27 matches the test pattern returned from the memory card 2 and decoded. That is, the test pattern is transmitted without errors. Although a bit error may, of course, occur even within the "bandwidth between the antennas" due to superposition of external noises, etc., it can be expected that the two test patterns almost always match each other. At step S15, the control circuit 21 determines, based on the comparison result, whether or not the errors in the received test pattern satisfy a reference value; if YES, then the process proceeds to step S4 of FIG. 10; if NO, then the process proceeds to step S16 of FIG. 11. If the comparison result satisfies the reference value determined in advance for the host apparatus 1 (a bit error rate of $10^{-2}$ for the test pattern returned from the memory card 2 and decoded, etc.), then the control circuit 21 determines to use the selected encoding method for subsequent communication. At step S16, the control circuit 21 determines whether or not all test patterns have been transmitted using all encoding methods; if YES, then the process ends; if NO, then the process proceeds to step S17 of FIG. 11. At step S17, the control circuit 21 selects an encoding method with the next maximum bandwidth, and the process returns to step S12.

Thus, the control circuit 21 determines a bandwidth corresponding to frequency components correctly transmitted between the host apparatus 1 and the memory card 2, and selects an encoding method requiring the maximum available bandwidth. The control circuit 21 changes over a plurality of encoding methods in descending order of required bandwidth, and selects an encoding method requiring a bandwidth corresponding to a first set of frequency components correctly transmitted between the host apparatus 1 and the memory card 2.

At step S4 of FIG. 10, in order to notify the memory card 2 of the selected encoding method, the control circuit 21 of the host apparatus 1 generates a selection notification message indicating the selected encoding method. Then, at step S5, the control circuit 21 sends the selection notification message to the encoder circuit 23 through the selector 22. The encoder circuit 23 encodes the selection notification message using the selected encoding method. Then, the data transmitter circuit 24 transmits the encoded selection notification message to the memory card 2 through the transmission line 12 and the transmitting antenna 11.

Figure 13:
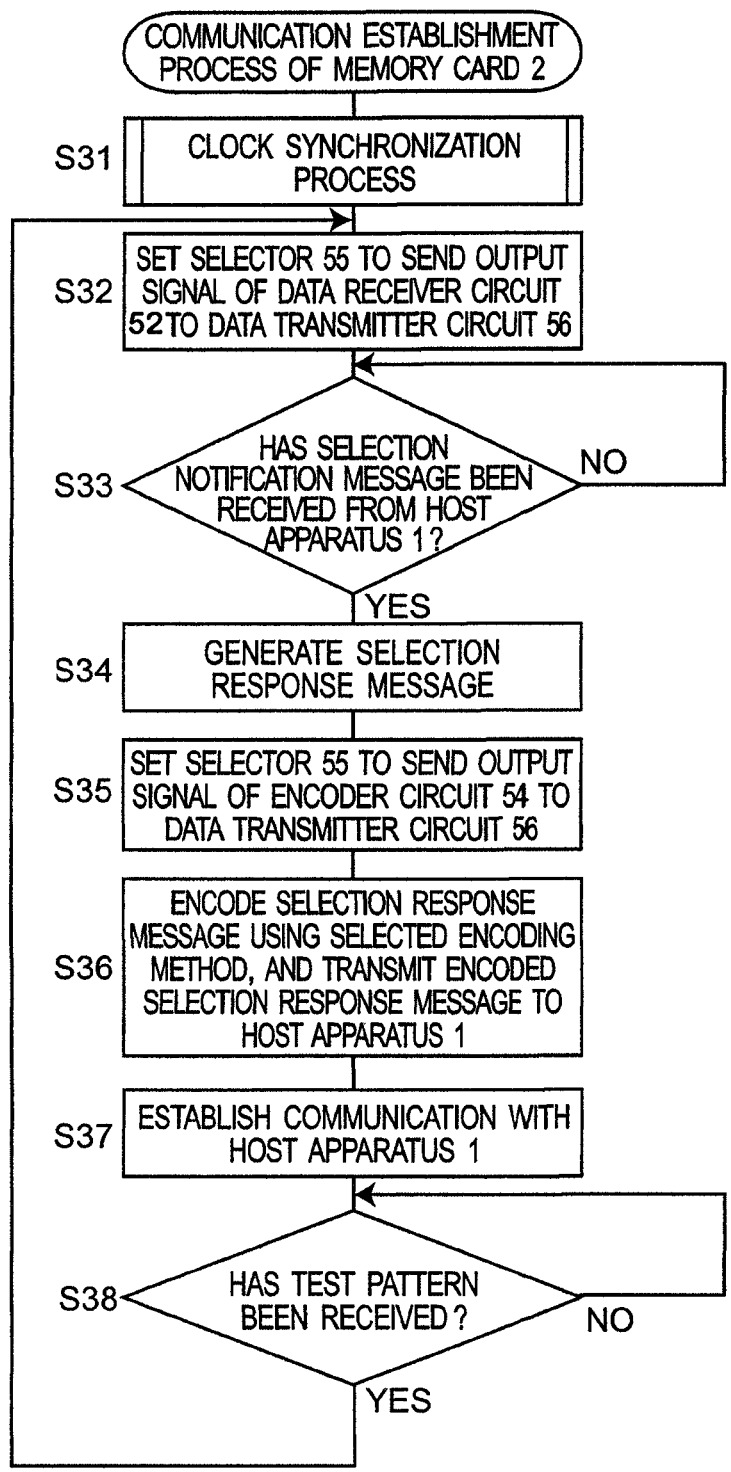
FIG. 13 is a flowchart showing a communication establishment process of the memory card 2, which is performed by a control circuit 51 of the memory card 2 of FIG. 1.

At step S33 of FIG. 13, the control circuit 51 of the memory card 2 determines whether or not a selection notification message has been received from the host apparatus 1 through the receiving antenna 41 and the transmission line 42; if YES, then the process proceeds to step S34.

A signal received by the memory card 2 from the host apparatus 1 is sent to the control circuit 51 through the decoder circuit 53, regardless of whether or not the signal is a selection notification message. Therefore, a test pattern is also sent to the control circuit 51. Since a test pattern is predetermined and thus is known to the control circuit 51, the control circuit 51 can determine whether a test pattern or other signals is being received from the host apparatus 1. When a test pattern has been correctly transmitted from the host apparatus 1 to the memory card 2, the control circuit 51 recognizes the received signal as a test pattern. However, the control circuit 51 only recognizes, and the control circuit 51 itself does not use the test pattern. On the other hand, when a test pattern has not been correctly transmitted from the host apparatus 1 to the memory card 2, the control circuit 51 ignores the received signal because the control circuit 51 cannot interpret the received signal. Therefore, regardless of whether or not a test pattern has been correctly transmitted, the control circuit 51 only recognizes the test pattern, and thus, other operation of the control circuit 51 is not affected.

At step S34, the decoder circuit 53 decodes the selection notification message using all decoding methods to obtain information about the selected encoding method. When the control circuit 51 obtains the information about the selected encoding method, the control circuit 51 generates a selection response message including an acknowledgement (ACK) to the selection notification message. At step S35, the control circuit 51 sets the selector 55 to send an output signal of the encoder circuit 54 to the data transmitter circuit 56. At step S36, the encoder circuit 54 encodes the selection response message using the selected encoding method, and the data transmitter circuit 56 transmits the encoded selection response message to the host apparatus 1 through the transmission line 44 and the transmitting antenna 43.

At step S6 of FIG. 10, the data receiver circuit 25 of the host apparatus 1 receives the selection response message received from the memory card 2 through the receiving antenna 13 and the transmission line 14, and the decoder circuit 26 decodes the received selection response message using a decoding method corresponding to the selected encoding method. The decoded selection response message is sent to the control circuit 21. At step S7, the control circuit 21 determines whether or not the selection response message includes an acknowledgement; if YES, then the process proceeds to step S8; if NO, then the process ends. At step S8 of FIG. 10 and at step S37 of FIG. 13, communication is established between the host apparatus 1 and the memory card 2. Thereafter, the host apparatus 1 and the memory card 2 perform baseband proximity contactless communication.

After the communication is established between the host apparatus 1 and the memory card 2, errors may occur in a data signal transmitted between the host apparatus 1 and the memory card 2 due to a change in the distance between the antennas during communication, etc. At step S9 of FIG. 10, the control circuit 21 of the host apparatus 1 determines whether or not the number of occurrences of communication errors exceeds a reference value; if YES, then the process returns to step S3. Meanwhile, at step S38 of FIG. 13, the control circuit 51 of the memory card 2 determines whether or not a test pattern has been received; if YES, then the process returns to step S32. The control circuit 21 of the host apparatus 1 newly selects an encoding method suitable for the current transmission characteristic between the antennas. Thus, communication is reestablished between the host apparatus 1 and the memory card 2. Thereafter, the transmission of the data signal interrupted by a communication error is resumed.

According to the proximity contactless communication system of the present embodiment, it is possible to establish communication by selecting an appropriate encoding method according to a bandwidth between the antennas of the host apparatus 1 and the memory card 2, for baseband proximity contactless communication between the antennas of the host apparatus 1 and the memory card 2.

In the above description, when the memory card 2 receives a selection notification message, the decoder circuit 53 of the memory card 2 decodes the selection notification message using all decoding methods. However, the configuration is not limited thereto. For example, the host apparatus 1 may transmit a predetermined bit sequence (e.g., 0101 . . . ) over a predetermined length, as a selection notification message, to the memory card 2. For example, when the 8b/10b encoding method is selected, "01" is repeated 10 times, and when the 4b/6b encoding method is selected, "01" is repeated 200 times, and when the 2b/4b encoding method is selected, "01" is repeated 300 times. The memory card 2 obtains information about the selected encoding method by detecting the number of repetitions of "01".

Figure 12:
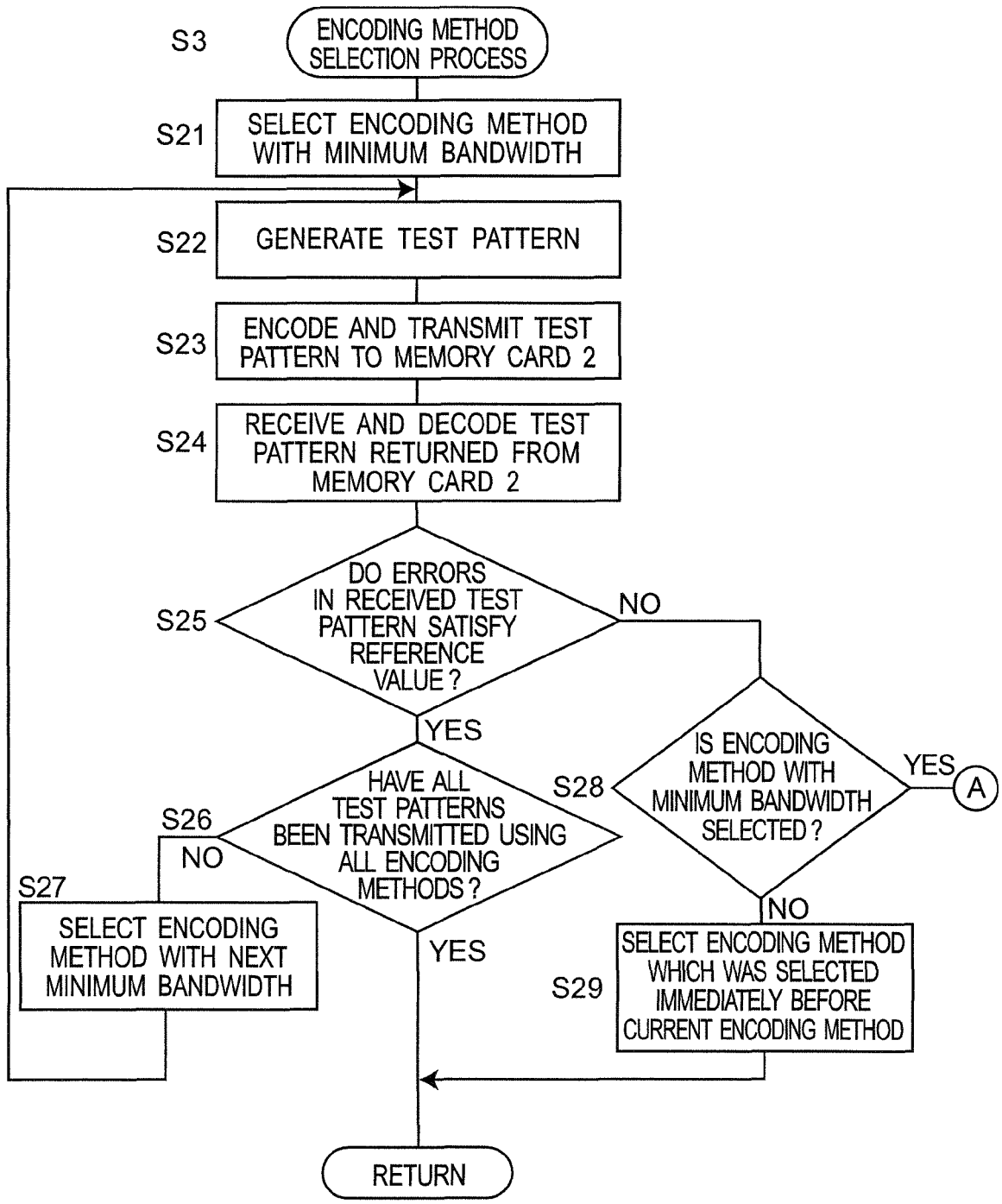
FIG. 12 is a flowchart showing a modified embodiment of an encoding method selection process S3 as a subroutine of FIG. 10.

FIG. 12 is a flowchart showing a modified embodiment of an encoding method selection process S3 as a subroutine of FIG. 10. In the encoding method selection process S3 of FIG. 11, the control circuit 21 changes over a plurality of encoding methods in descending order of required bandwidth. Alternatively, the control circuit 21 may change over a plurality of encoding methods in ascending order of required bandwidth.

At step S21 of FIG. 12, the control circuit 21 of the host apparatus 1 selects an encoding method with the minimum bandwidth. When baseband proximity contactless communication is performed through the antennas of the host apparatus 1 and the memory card 2 disposed at some distance from each other, it is expected that only over a narrow bandwidth, the transmission coefficient between the antennas is higher than the limit of attenuation. Therefore, when the encoder circuit 23 encodes a test pattern, the control circuit 21 changes over the plurality of encoding methods in ascending order of required bandwidth, i.e., in order of the 2b/4b encoding method, the 4b/6b encoding method, and the 8b/10b encoding method. Thus, it is possible to establish communication in a short time over a narrow bandwidth between the antennas.

Then, at step S22, the control circuit 21 generates a test pattern using the test pattern generator circuit 27. At step S23, the control circuit 21 sends the generated test pattern to the encoder circuit 23 through the selector 22. The encoder circuit 23 encodes the test pattern using the selected encoding method. Then, the data transmitter circuit 24 transmits the encoded test pattern to the memory card 2 through the transmission line 12 and the transmitting antenna 11. The memory card 2 operates in a manner similar to that of the case in which the control circuit 21 of the host apparatus 1 performs encoding method selection process S3 of FIG. 11.

At step S24, the data receiver circuit 25 of the host apparatus 1 receives a test pattern returned from the memory card 2 through the receiving antenna 13 and the transmission line 14, and the decoder circuit 26 decodes the returned test pattern using a decoding method corresponding to the selected encoding method. The decoded test pattern is sent to the comparator circuit 28. The comparator circuit 28 compares the test pattern generated by the test pattern generator circuit 27, with the test pattern returned from the memory card 2 and decoded, and sends a comparison result to the control circuit 21. At step S25, the control circuit 21 determines, based on the comparison result, whether or not errors in the received test pattern satisfy a reference value; if YES, then the process proceeds to step S26; if NO, then the process proceeds to step S28. At step S26, the control circuit 21 determines whether or not all test patterns have been transmitted using all encoding methods; if YES, then the process proceeds to step S4 of FIG. 10; if NO, then the process proceeds to step S27. At step S27, the control circuit 21 selects an encoding method with the next minimum bandwidth, and the process returns to step S22. At step S28, the control circuit 21 determines whether or not an encoding method with the minimum bandwidth is selected; if YES, then the process ends; if NO, then the process proceeds to step S29. At step S29, the control circuit 21 selects an encoding method which was selected immediately before the current encoding method, and the process proceeds to step S4 of FIG. 10.

Thus, the control circuit 21 determines a bandwidth corresponding to frequency components correctly transmitted between the host apparatus 1 and the memory card 2, and selects an encoding method requiring the maximum available bandwidth. The control circuit 21 changes over a plurality of encoding methods in ascending order of required bandwidth, and selects an encoding method requiring a bandwidth corresponding to a last set of frequency components correctly transmitted between the host apparatus 1 and the memory card 2.

Second Embodiment

Figure 15:
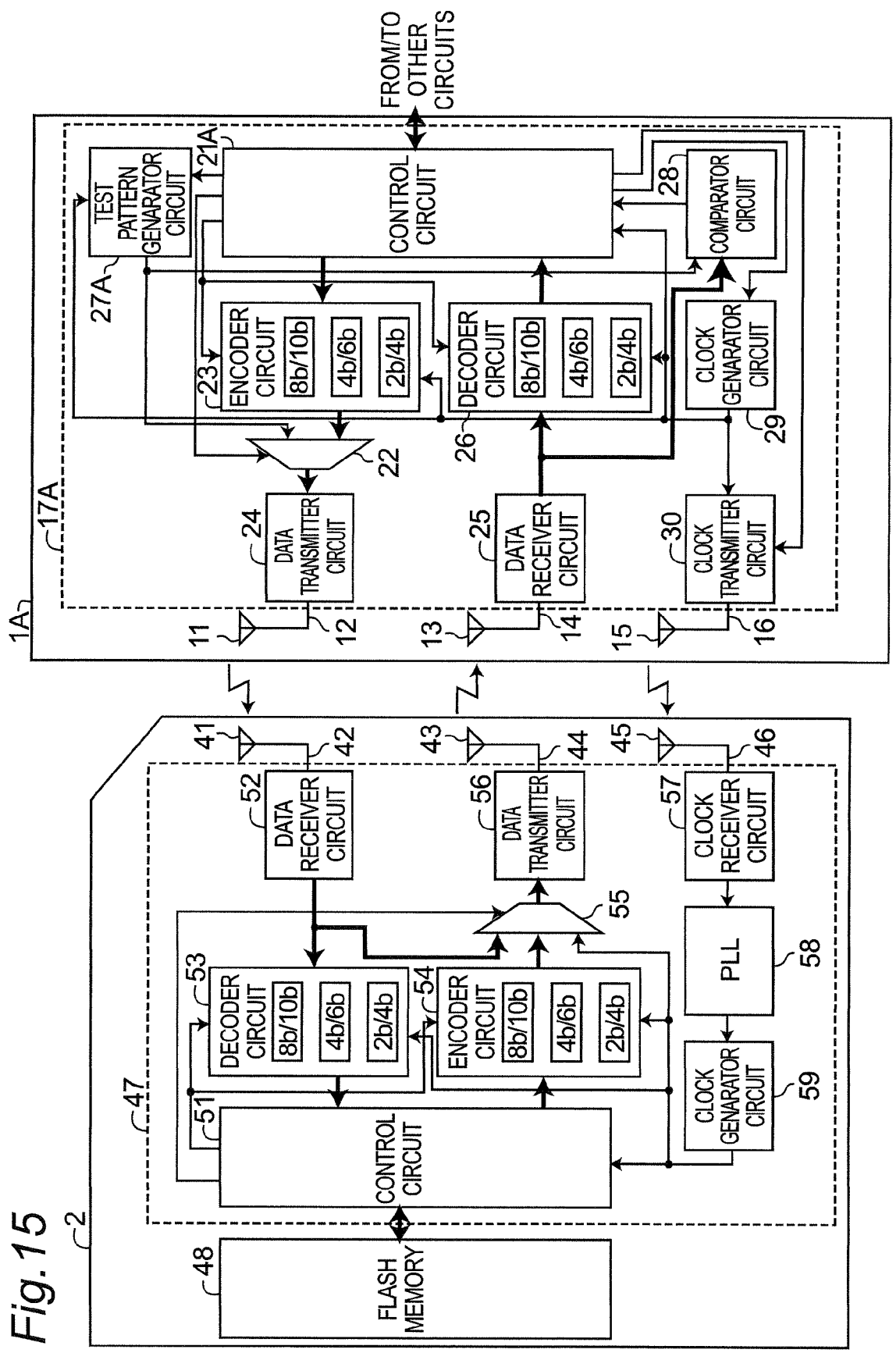
FIG. 15 is a block diagram showing a configuration of a proximity contactless communication system according to a second embodiment.

FIG. 15 is a block diagram showing a configuration of a proximity contactless communication system according to a second embodiment. According to first embodiment, a test pattern is encoded by an encoder circuit 23. On the other hand, according to the second embodiment, a test pattern is not encoded.

A host apparatus 1A of FIG. 15 is provided with: a control circuit 21A performing a communication establishment process different from that of the first embodiment (FIG. 10); and a test pattern generator circuit 27A generating a test pattern different from that of the first embodiment. The test pattern generator circuit 27A generates a test pattern including a plurality of different frequency components corresponding to a plurality of different bandwidths required by a plurality of encoding methods. A selector 22 is provided not between the control circuit 21A and the encoder circuit 23, but between an encoder circuit 23 and a data transmitter circuit 24. The control circuit 21A controls the selector 22 to send one of the test pattern generated by the test pattern generator circuit 27A, and an encoded data signal, to the data transmitter circuit 24. A comparator circuit 28 compares the test pattern generated by the test pattern generator circuit 27A, with a test pattern transmitted to a memory card 2 through a transmitting antenna 11 and returned from the memory card 2 through a receiving antenna 13. Then, the comparator circuit 28 sends a comparison result to the control circuit 21A. The other components of the host apparatus 1A and the components of the memory card 2 are the same as those of the first embodiment.

Figure 16:
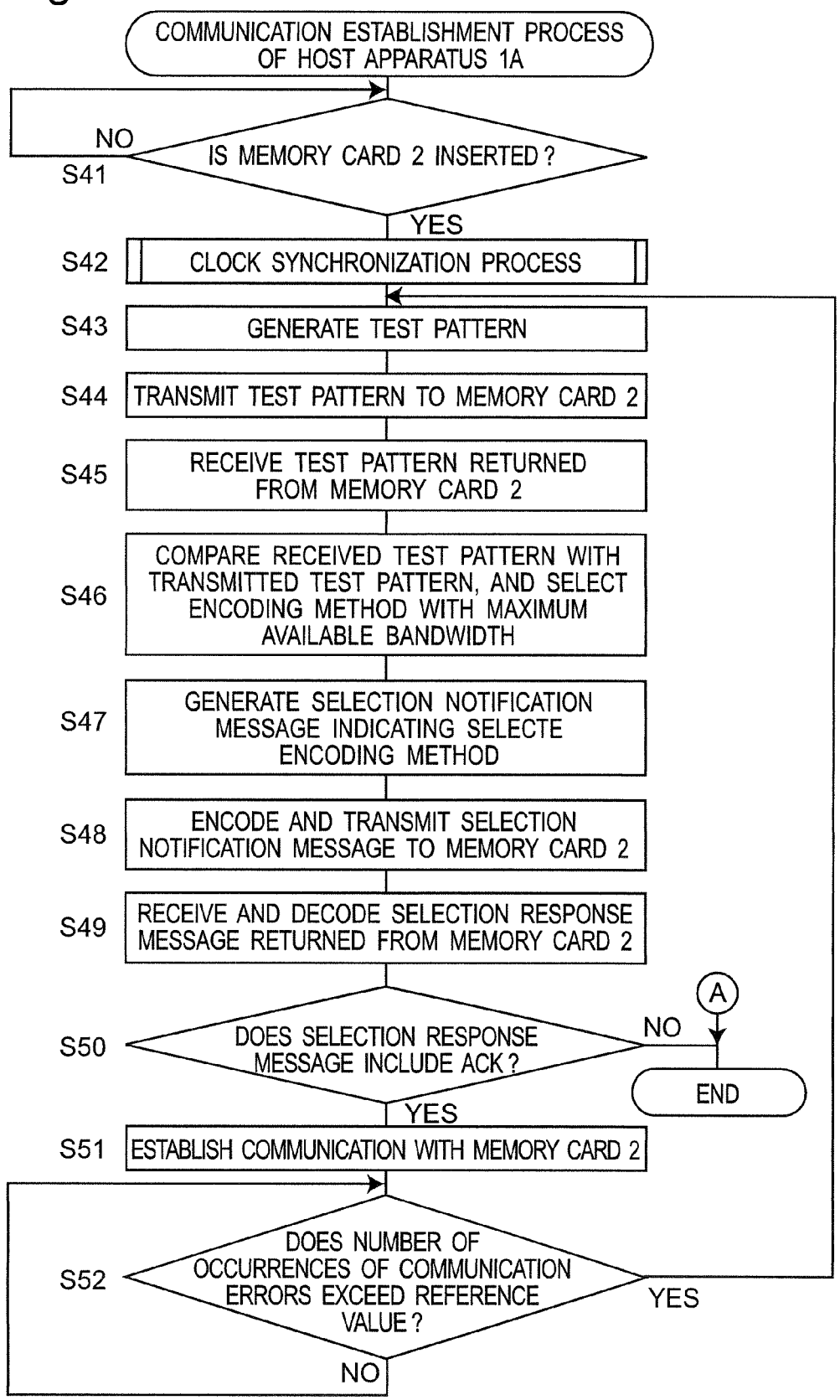
FIG. 16 is a flowchart showing a communication establishment process of a host apparatus 1A, which is performed by a control circuit 21A of the host apparatus 1A of FIG. 15.

FIG. 16 is a flowchart showing a communication establishment process of the host apparatus 1A, which is performed by the control circuit 21A of the host apparatus 1A of FIG. 15.

At step S41, the control circuit 21A of the host apparatus 1A determines whether or not the memory card 2 is inserted; if YES, then the control circuit 21A performs a clock synchronization process at step S42. The clock synchronization process S42 of FIG. 16 is the same as the clock synchronization process S2 of FIG. 10.

Then, at step S43, the control circuit 21A generates a test pattern using the test pattern generator circuit 27A.

FIG. 17 is a diagram showing a first example of a test pattern generated at step S43 of FIG. 16. The test pattern is a binary signal having the first level "0" and the second level "1", and includes a plurality of subpatterns F1 to F5 corresponding to a plurality of frequency components $f_0$, $f_0/2$, $f_0/3$, $f_0/4$, and $f_0/5$, respectively (i.e., all frequency components corresponding to a plurality of different bandwidths required by the plurality of encoding methods). Each of the plurality of subpatterns F1 to F5 includes: a portion of first levels over a predetermined consecutive bit length, the bit length being determined according to a frequency component corresponding to the subpattern; and a portion of second levels over the same consecutive bit length. The higher the frequency component is, the shorter the bit length determined according to the frequency component is. For example, The bit length is 1 bit for the frequency component $f_0$, and the bit length is 5 bits for the frequency component $f_0/5$. In the test pattern of FIG. 17, each subpattern includes one portion of first levels and one portion of second levels.

Figure 18:
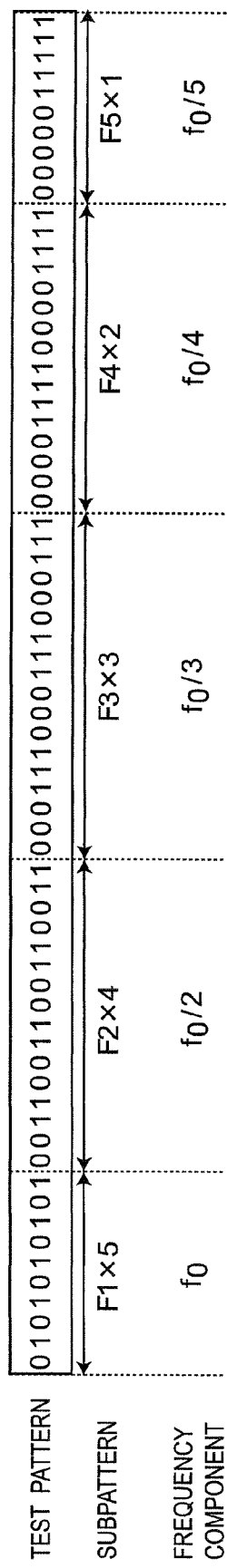
FIG. 18 is a diagram showing a second example of a test pattern generated at step S43 of FIG. 16.

FIG. 18 is a diagram showing a second example of a test pattern generated at step S43 of FIG. 16. In each of a plurality of subpatterns F1 to F5, the higher the frequency component corresponding to the subpattern is, the more times the portion of first levels and the portion of second levels is repeated. For example, "01", i.e., the subpattern F1 corresponding to the frequency component $f_0$ is repeated five times, and "0000011111", i.e., the subpattern F5 corresponding to the frequency component $f_0/5$ appears only once. In general, when a data signal is transmitted, the higher the frequency is, the more the jitter due to superposition of external noise, etc., significantly affects signal quality. Hence, by repeating a subpattern corresponding to a high frequency component many times, it is possible to surely transmit a test pattern between the host apparatus 1A and the memory card 2, thus reliably selecting an appropriate encoding method.

At step S44 of FIG. 16, the control circuit 21A sends the generated test pattern to the data transmitter circuit 24 through the selector 22. The data transmitter circuit 24 transmits the test pattern to the memory card 2 through a transmission line 12 and the transmitting antenna 11.

The memory card 2 operates in a manner similar to that of the case in which a control circuit 21 of a host apparatus 1 performs a communication establishment process of FIG. 10.

At step S45, a data receiver circuit 25 of the host apparatus 1A receives a test pattern returned from the memory card 2, through the receiving antenna 13 and a transmission line 14, and sends the returned test pattern to the comparator circuit 28. The comparator circuit 28 compares the test pattern generated by the test pattern generator circuit 27A, with the test pattern returned from the memory card 2, and sends a comparison result to the control circuit 21A. At step S46, the control circuit 21A compares the received test pattern with the transmitted test pattern based on the comparison result, and selects an encoding method with the maximum available bandwidth. For example, when subpatterns F1 to F4 have been correctly transmitted but a subpattern F5 has not been correctly transmitted, the control circuit 21A selects the 2*b*/4*b* encoding method. At step S47, in order to notify the memory card 2 of the selected encoding method, the control circuit 21A generates a selection notification message indicating the selected encoding method. At step S48, the control circuit 21A encodes the selection notification message by the encoder circuit 23, and then sends the encoded selection notification message to the data transmitter circuit 24 through the selector 22. The data transmitter circuit 24 transmits the encoded selection notification message to the memory card 2 through the transmission line 12 and the transmitting antenna 11.

At step S49, the data receiver circuit 25 of the host apparatus 1A receives a selection response message received from the memory card 2 through the receiving antenna 13 and the transmission line 14, and a decoder circuit 26 decodes the received selection response message using a decoding method corresponding to the selected encoding method. The decoded selection response message is sent to the control circuit 21A. At step S50, the control circuit 21A determines whether or not the selection response message includes an acknowledgement (ACK); if YES, then the process proceeds to step S51; if NO, then the process ends. At step S51 of FIG. 16 and at step S37 of FIG. 13, communication is established between the host apparatus 1A and the memory card 2. Thereafter, the host apparatus 1A and the memory card 2 perform baseband proximity contactless communication.

After the communication is established between the host apparatus 1A and the memory card 2, at step S52, the control circuit 21A determines whether or not the number of occurrences of communication errors exceeds a reference value; if YES, then the process returns to step S43.

According to the proximity contactless communication system of the present embodiment, it is possible to establish communication by selecting an appropriate encoding method according to a bandwidth between the antennas of the host apparatus 1A and the memory card 2, for baseband proximity contactless communication between the antennas of the host apparatus 1A and the memory card 2.

Next, with reference to FIGS. 19 to 21, a clock synchronization process (step S2 of FIG. 10, step S31 of FIG. 13, and step S42 of FIG. 16) will be described.

In a clock synchronization process, a clock signal of the host apparatus 1 is synchronized with a clock signal of the memory card 2. By performing clock synchronization process S2, it is possible to determine, in advance of encoding method selection process S3 of FIG. 10, whether or not a test pattern having a frequency component $f_0$ equals to the frequency of the clock signal can be transmitted between the host apparatus 1 and the memory card 2.

Figure 19:
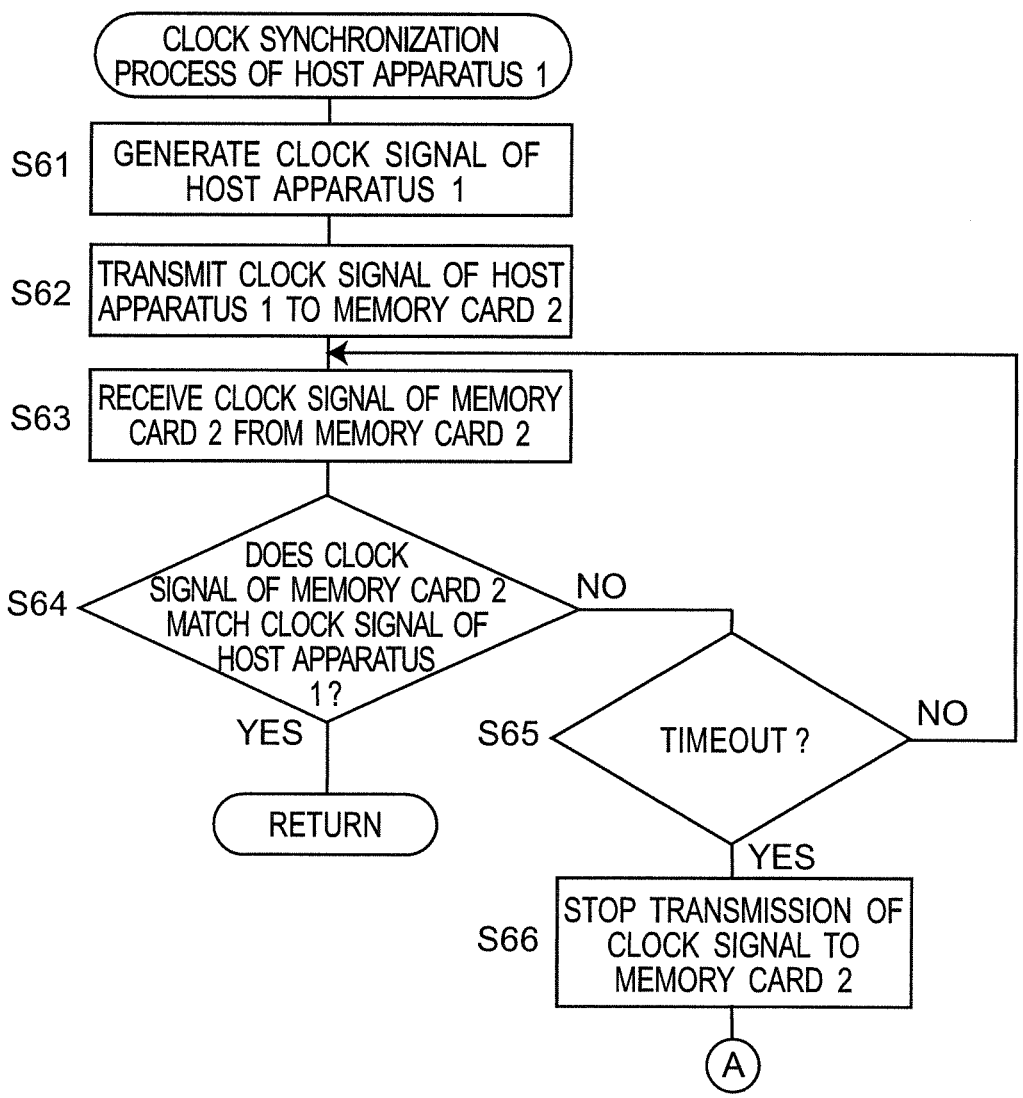
FIG. 19 is a flowchart showing a clock synchronization process of the host apparatus 1, which is performed by the control circuit 21 of the host apparatus 1 of FIG. 1.

FIG. 19 is a flowchart showing a clock synchronization process of the host apparatus 1, which is performed by the control circuit 21 of the host apparatus 1 of FIG. 1. At step S61 of FIG. 19, the control circuit 21 generates a clock signal of the host apparatus 1 by the clock generator circuit 29. At step S62, the control circuit 21 transmits, by the clock transmitter circuit 30, the clock signal of the host apparatus 1 to the memory card 2 through the transmission line 16 and the transmitting antenna 15.

Figure 20:
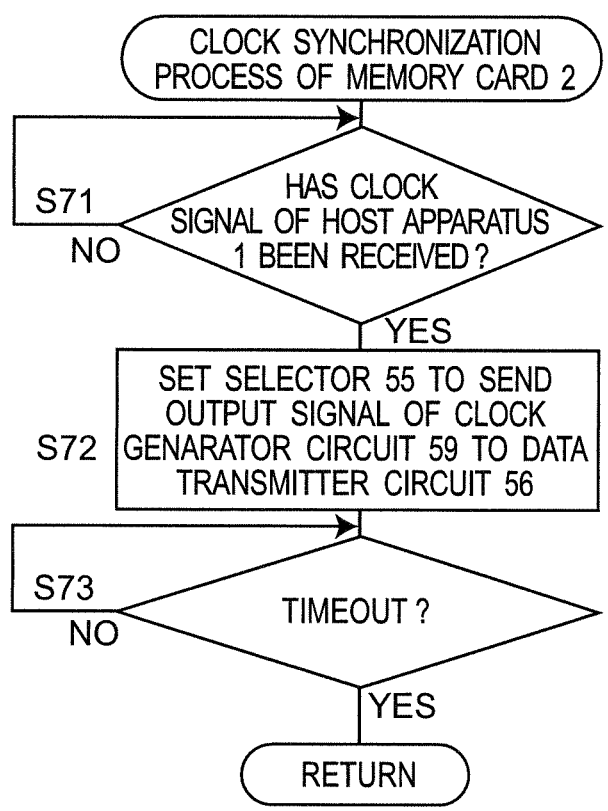
FIG. 20 is a flowchart showing a clock synchronization process of the memory card 2, which is performed by the control circuit 51 of the memory card 2 of FIG. 1.

FIG. 20 is a flowchart showing a clock synchronization process of the memory card 2, which is performed by the control circuit 51 of the memory card 2 of FIG. 1. At step S71 of FIG. 20, the control circuit 51 of the memory card 2 determines whether or not a clock signal of the host apparatus 1 has been received through the receiving antenna 45 and the transmission line 46; if YES, then the process proceeds to step S72. When the memory card 2 has received the clock signal of the host apparatus 1, the PLL 58 and the clock generator circuit 59 generate a clock signal of the memory card 2, based on the clock signal of the host apparatus 1. At step S72, the control circuit 51 sets the selector 55 to send an output signal of the clock generator circuit 59 to the data transmitter circuit 56. Thus, the data transmitter circuit 56 transmits the clock signal of the memory card 2 to the host apparatus 1 through the transmission line 44 and the transmitting antenna 43.

At step S63 of FIG. 19, the data receiver circuit 25 of the host apparatus 1 receives the clock signal of the memory card 2 from the memory card 2 through the receiving antenna 13 and the transmission line 14. At step S64, the control circuit 21 determines whether or not the clock signal of the memory card 2 matches the clock signal of the host apparatus 1; if YES, then the process proceeds to step S3 of FIG. 10; if NO, then the process proceeds to step S65 of FIG. 19. At step S65, the control circuit 21 determines whether or not predetermined timeout time has elapsed; if YES, then the process proceeds to step S66; if NO, then the process returns to step S63. At step S66, the control circuit 21 stops the transmission of the clock signal of the host apparatus 1 to the memory card 2, and the process ends.

When the clock signal of the memory card 2, that matches the clock signal of the host apparatus 1, has not been received even after the predetermined timeout time has elapsed (i.e., a condition in which baseband proximity contactless communication is not possible), the control circuit 21 of the host apparatus 1 stops the transmission of the clock signal of the host apparatus 1 to the memory card 2, thus avoiding power consumption for transmitting of a waste clock signal.

After step S72 of FIG. 20, at step S73, the control circuit 51 of the memory card 2 determines whether or not predetermined timeout time has elapsed; if YES, then the process proceeds to step S32 of FIG. 13.

As described above, by performing clock synchronization process S2, the control circuit 21 of the host apparatus 1 can determine, in advance of encoding method selection process S3 of FIG. 10, whether or not a test pattern having a frequency component $f_0$ equals to the frequency of a clock signal can be transmitted between the host apparatus 1 and the memory card 2.

Figure 21:
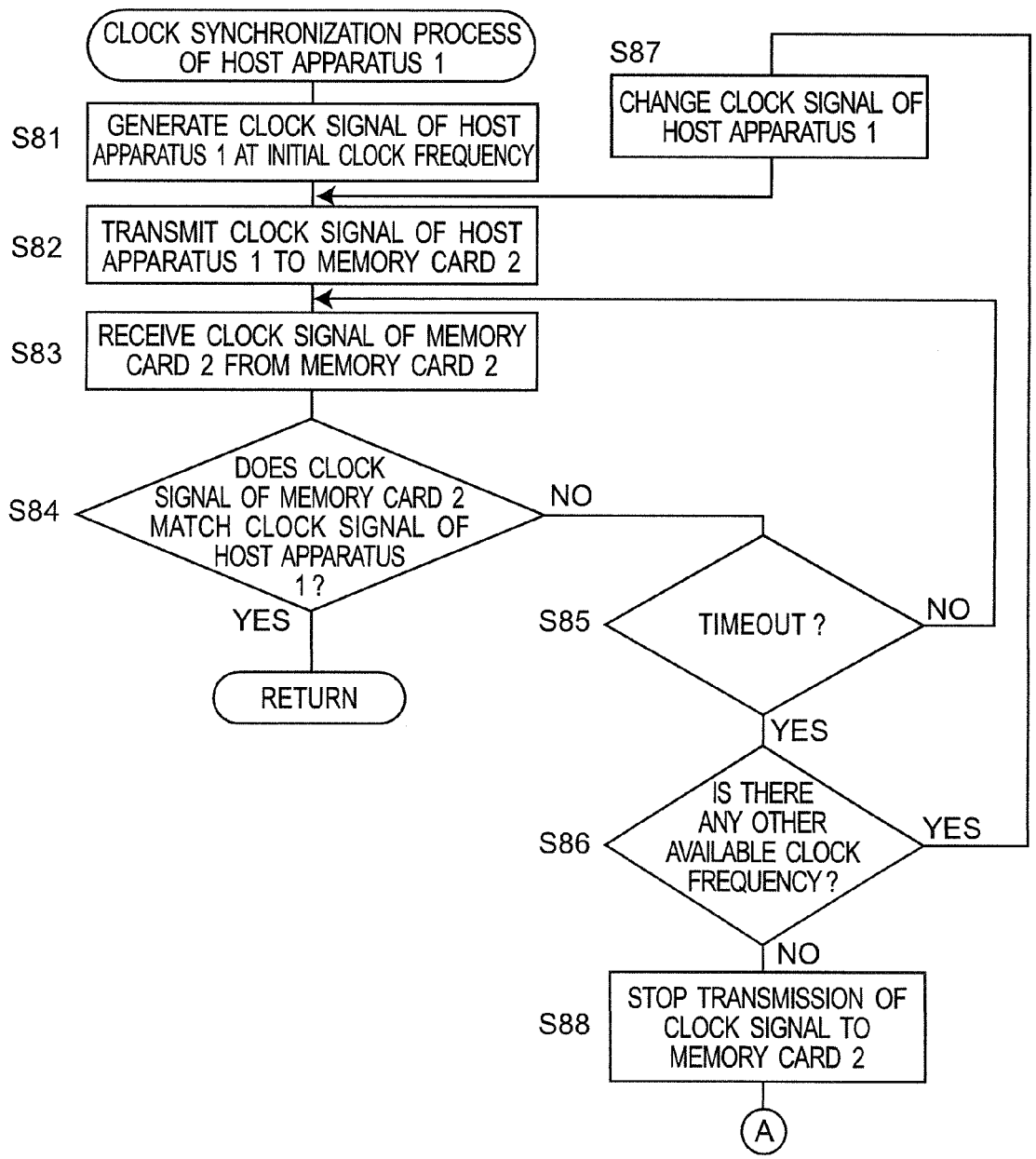
FIG. 21 is a flowchart showing a modified embodiment of a clock synchronization process of the host apparatus 1, which is performed by the control circuit 21 of the host apparatus 1 of FIG. 1.

FIG. 21 is a flowchart showing a modified embodiment of the clock synchronization process of the host apparatus 1, which is performed by the control circuit 21 of the host apparatus 1 of FIG. 1.

The clock frequency $f_0$ of the host apparatus 1 and the memory card 2 may not be within the "bandwidth between the antennas", depending on conditions between the antennas of the host apparatus 1 and the memory card 2. For example, in FIG. 6, the case in which the clock frequency $f_0=1.5$ GHz and the distance between the antennas is 2 mm is considered. At the clock frequency $f_0=1.5$ GHz, the transmission coefficient is not large enough. In this case, for example, by changing the clock frequency $f_0$ to 1.2 GHz, the transmission coefficients for the frequency components $f_0=1.2$ GHz and $f_0/2=600$ MHz are higher than the limit of attenuation, and accordingly, the 2b/4b encoding method can be selected for baseband proximity contactless communication.

In case of FIG. 21, the clock generator circuit 29 can generate a plurality of clock frequencies (e.g., an initial clock frequency $f_0$, a frequency higher by 20% than the initial clock frequency $f_0$, and a frequency lower by 20% than the initial clock frequency $f_0$).

At step S81 of FIG. 21, the control circuit 21 generates a clock signal of the host apparatus 1 at an initial clock frequency by the clock generator circuit 29. At step S82, the control circuit 21 transmits, by the clock transmitter circuit 30, the clock signal of the host apparatus 1 to the memory card 2 through the transmission line 16 and the transmitting antenna 15.

The memory card 2 operates in a manner similar to that of the case in which the control circuit 21 of the host apparatus 1 performs a clock synchronization process of FIG. 19.

At step S83, the data receiver circuit 25 of the host apparatus 1 receives a clock signal of the memory card 2 from the memory card 2 through the receiving antenna 13 and the transmission line 14. At step S84, the control circuit 21 determines whether or not the clock signal of the memory card 2 matches the clock signal of the host apparatus 1; if YES, then the process proceeds to step S3 of FIG. 10; if NO, then the process proceeds to step S85 of FIG. 21. At step S85, the control circuit 21 determines whether or not predetermined timeout time has elapsed; if YES, then the process proceeds to step S86; if NO, then the process returns to step S83. At step S86, the control circuit 21 determines whether or not there is any other available clock frequency; if YES, then the process proceeds to step S87; if NO, then the process proceeds to step S88. At step S87, the control circuit 21 changes the clock signal of the host apparatus 1 (e.g., change the clock signal to either a frequency higher by 20% than the initial clock frequency $f_0$ or a frequency lower by 20% than the initial clock frequency $f_0$) by the clock generator circuit 29, and the process proceeds to step S82. Thereafter, the clock signal of the host apparatus 1 is compared again with a clock signal of the memory card 2 received from the memory card 2 when the clock signal of the host apparatus 1 is transmitted to the memory card 2. On the other hand, at step S88, the control circuit 21 stops the transmission of the clock signal of the host apparatus 1 to the memory card 2, and the process ends.

As described above, it is possible to change the clock frequency when a frequency component of a clock frequency cannot be transmitted between the antennas of the host apparatus 1 and the memory card 2.

When it has determined in a clock synchronization process whether or not a clock signal having a clock frequency $f_0$ can be transmitted, a test pattern used in the subsequent encoding method selection process S3 of FIG. 10 does not need to include a frequency component $f_0$ (i.e., a subpattern as a binary signal having the first level "0" and the second level "1" alternating per bit). Thus, the time required for a communication establishment process can be reduced.

The clock synchronization processes of FIGS. 19 and 21 are also performed by the control circuit 21A of the host apparatus 1A of FIG. 15 in a similar manner.

In the above-described embodiments, the 8b/10b encoding method, the 4b/6b encoding method, and the 2b/4b encoding method are used as exemplary encoding methods. The encoding methods are not limited thereto, and the embodiments can also be applied to other encoding methods, such as the 64b/66b encoding method, and the 128b/130b encoding method.

In FIG. 1, components for transmitting a data signal (the data transmitter circuit 24, the transmission line 12, the transmitting antenna 11, the receiving antenna 41, the transmission line 42, and the data receiver circuit 52), and components for transmitting a clock signal (the clock transmitter circuit 30, the transmission line 16, the transmitting antenna 15, the receiving antenna 45, the transmission line 46, and the clock receiver circuit 57) are separately provided. However, the configuration is not limited thereto, and the same components may be shared. In this case, the memory card 2 performs clock recovery based on a received data signal.

The configuration is not limited to using a pair of the transmitting antenna 11 and the receiving antenna 41 to transmit a signal from the host apparatus 1 to the memory card 2, as shown in FIG. 1, and differential signals may be transmitted using two pairs of antennas. The same applies to the case in which a signal is transmitted from the memory card 2 to the host apparatus 1.

Proximity contactless communication apparatuses, a proximity contactless communication system, and a proximity contactless communication method according to the present disclosure are characterized by the following configuration.

According to the first aspect of the present disclosure, a proximity contactless communication apparatus which is a first communication apparatus of a proximity contactless communication system for baseband communication between the first communication apparatus and a second communication apparatus. The second communication apparatus is provided with at least one transmitting antenna and at least one receiving antenna. The proximity contactless communication apparatus is provided with: at least one transmitting antenna disposed close to the receiving antenna of the second communication apparatus; at least one receiving antenna disposed close to the transmitting antenna of the second communication apparatus; an encoder circuit configured to use a plurality of encoding methods requiring different bandwidths for transmission, respectively; a decoder circuit configured to use a plurality of decoding methods corresponding to the plurality of encoding methods; a test pattern generator circuit configured to generate test patterns; a comparator circuit configured to compare two test patterns; and a control circuit configured to perform a process for establishing communication between the proximity contactless communication apparatus and the second communication apparatus. The test patterns are generated to include a plurality of different frequency components when the test patterns are transmitted between the proximity contactless communication apparatus and the second communication apparatus, the plurality of different frequency components corresponding to the plurality of different bandwidths required by the plurality of encoding methods. In the process for establishing communication between the proximity contactless communication apparatus and the second communication apparatus, the control circuit is configured to: compare, by the comparator circuit, a test pattern generated by the test pattern generator circuit, with a test pattern transmitted to the second communication apparatus through the transmitting antenna of the proximity contactless communication apparatus and returned from the second communication apparatus through the receiving antenna of the proximity contactless communication apparatus; determine a bandwidth corresponding to frequency components correctly transmitted between the proximity contactless communication apparatus and the second communication apparatus, based on the returned test pattern, and select an encoding method requiring a maximum available bandwidth; generate a notification message indicating the selected encoding method, and encode the notification message by the encoder circuit using the selected encoding method, and transmit the encoded notification message to the second communication apparatus through the transmitting antenna of the proximity contactless communication apparatus; and establish communication between the proximity contactless communication apparatus and the second communication apparatus, when receiving a response message including an acknowledgement to the notification message, from the second communication apparatus, through the receiving antenna of the proximity contactless communication apparatus.

According to the second aspect of the present disclosure: in the proximity contactless communication apparatus of the first aspect of the present disclosure, the control circuit is configured to encode the test pattern by the encoder circuit using one of the plurality of encoding methods, before transmitting the test pattern to the second communication apparatus.

According to the third aspect of the present disclosure: in the proximity contactless communication apparatus of the second aspect of the present disclosure, the control circuit is configured to: change over the plurality of encoding methods in descending order of required bandwidth, when encoding the test pattern by the encoder circuit; and select an encoding method requiring a bandwidth corresponding to a first set of frequency components correctly transmitted between the proximity contactless communication apparatus and the second communication apparatus.

According to the fourth aspect of the present disclosure: in the proximity contactless communication apparatus of the second aspect of the present disclosure, the control circuit is configured to: change over the plurality of encoding methods in ascending order of required bandwidth, when encoding the test pattern by the encoder circuit; and select an encoding method requiring a bandwidth corresponding to a last set of frequency components correctly transmitted between the proximity contactless communication apparatus and the second communication apparatus.

According to the fifth aspect of the present disclosure: in the proximity contactless communication apparatus of the first aspect of the present disclosure, the test pattern generator circuit is configured to generate a test pattern including a plurality of different frequency components corresponding to the plurality of different bandwidths required by the plurality of encoding methods.

According to the sixth aspect of the present disclosure: in the proximity contactless communication apparatus of the fifth aspect of the present disclosure, the test pattern is a binary signal having a first level and a second level, and includes a plurality of subpatterns corresponding to the plurality of frequency components, respectively. Each of the plurality of subpatterns includes: a portion of first levels over a predetermined consecutive bit length, the bit length being determined according to a frequency component corresponding to the subpattern; and a portion of second levels over the same consecutive bit length.

According to the seventh aspect of the present disclosure: in the proximity contactless communication apparatus of the sixth aspect of the present disclosure, the bit length determined according to the frequency component decreases as the frequency component increases. In each of the plurality of subpatterns, a number of repetitions of the portion of first levels and the portion of second levels increases as a frequency component corresponding to the subpattern increases.

According to the eighth aspect of the present disclosure: in the proximity contactless communication apparatus of any one of the first to seventh aspects of the present disclosure, when a number of occurrences of communication errors exceeds a reference value after the communication is established between the proximity contactless communication apparatus and the second communication apparatus, the process for establishing communication between the proximity contactless communication apparatus and the second communication apparatus is performed again.

According to the ninth aspect of the present disclosure: the proximity contactless communication apparatus of any one of the first to eighth aspects of the present disclosure is further provided with a clock generator circuit configured to generate a clock signal of the proximity contactless communication apparatus. Before performing the process for establishing communication between the proximity contactless communication apparatus and the second communication apparatus, the control circuit is configured to: transmit the clock signal of the proximity contactless communication apparatus to the second communication apparatus through the transmitting antenna of the proximity contactless communication apparatus; compare the clock signal of the proximity contactless communication apparatus, with a clock signal of the second communication apparatus received from the second communication apparatus through the receiving antenna of the proximity contactless communication apparatus when transmitting the clock signal of the proximity contactless communication apparatus to the second communication apparatus; and perform the process for establishing communication between the proximity contactless communication apparatus and the second communication apparatus, when the clock signal of the second communication apparatus matches the clock signal of the proximity contactless communication apparatus.

According to the tenth aspect of the present disclosure: in the proximity contactless communication apparatus of the ninth aspect of the present disclosure, when the clock signal of the second communication apparatus differs from the clock signal of the proximity contactless communication apparatus, the control circuit is configured to: change a clock frequency of the clock signal of the proximity contactless communication apparatus generated by the clock generator circuit; and compare again the clock signal of the proximity contactless communication apparatus, with a clock signal of the second communication apparatus received from the second communication apparatus when transmitting the clock signal of the proximity contactless communication apparatus to the second communication apparatus.

According to the eleventh aspect of the present disclosure: in the proximity contactless communication apparatus of the ninth or tenth aspect of the present disclosure, when predetermined timeout time has elapsed before receiving the clock signal of the second communication apparatus that matches the clock signal of the proximity contactless communication apparatus, the control circuit is configured to stop the transmission of the clock signal of the proximity contactless communication apparatus to the second communication apparatus.

According to the twelfth aspect of the present disclosure: in the proximity contactless communication apparatus of any one of the ninth to eleventh aspects of the present disclosure, the test pattern does not include a subpattern as a binary signal having a first and a second level alternating per bit.

According to the thirteenth aspect of the present disclosure, a proximity contactless communication apparatus which is a second communication apparatus of a proximity contactless communication system for baseband communication between a first communication apparatus and the second communication apparatus. The first communication apparatus is provided with at least one transmitting antenna and at least one receiving antenna. The proximity contactless communication apparatus is provided with: at least one transmitting antenna disposed close to the receiving antenna of the first communication apparatus; at least one receiving antenna disposed close to the transmitting antenna of the first communication apparatus; an encoder circuit configured to use a plurality of encoding methods requiring different bandwidths for transmission, respectively; a decoder circuit configured to use a plurality of decoding methods corresponding to the plurality of encoding methods; and a control circuit configured to perform a process for establishing communication between the proximity contactless communication apparatus and the first communication apparatus. In the process for establishing communication between the proximity contactless communication apparatus and the first communication apparatus, the control circuit is configured to: return, when a test pattern including a plurality of different frequency components corresponding to the plurality of different bandwidths required by the plurality of encoding methods is received from the first communication apparatus through the receiving antenna of the proximity contactless communication apparatus, the received test pattern to the first communication apparatus through the transmitting antenna of the proximity contactless communication apparatus; generate, when a notification message indicating one encoding method selected from the plurality of encoding methods is received from the first communication apparatus through the receiving antenna of the proximity contactless communication apparatus, a response message including an acknowledgement to the notification message, and encode the response message by the encoder circuit using the selected encoding method, and transmits the encoded response message to the first communication apparatus through the transmitting antenna of the proximity contactless communication apparatus; and establish communication between the proximity contactless communication apparatus and the first communication apparatus.

According to the fourteenth aspect of the present disclosure: the proximity contactless communication apparatus of the thirteenth aspect of the present disclosure is further provided with a clock generator circuit configured to generate a clock signal of the proximity contactless communication apparatus, based on a clock signal of the first communication apparatus received from the first communication apparatus through the receiving antenna of the proximity contactless communication apparatus. Before performing the process for establishing communication between the proximity contactless communication apparatus and the first communication apparatus, the control circuit is configured to transmit the clock signal of the proximity contactless communication apparatus to the first communication apparatus through the transmitting antenna of the proximity contactless communication apparatus.

According to the fifteenth aspect of the present disclosure, a proximity contactless communication system for baseband communication between a first communication apparatus and a second communication apparatus, the proximity contactless communication system is provided with: the proximity contactless communication apparatus of any one of the first to eighth aspects of the present disclosure as the first communication apparatus; and the proximity contactless communication apparatus of the thirteenth aspect of the present disclosure as the second communication apparatus.

According to the sixteenth aspect of the present disclosure, a proximity contactless communication system for baseband communication between a first communication apparatus and a second communication apparatus, the proximity contactless communication system is provided with: the proximity contactless communication apparatus of any one of the ninth to twelfth aspects of the present disclosure as the first communication apparatus; and the proximity contactless communication apparatus of the fourteenth aspect of the present disclosure as the second communication apparatus.

According to the seventeenth aspect of the present disclosure, a proximity contactless communication method for baseband communication between a first communication apparatus and a second communication apparatus. Each of the first and second communication apparatuses is provided with at least one transmitting antenna and at least one receiving antenna, the transmitting antenna of the first communication apparatus is disposed close to the receiving antenna of the second communication apparatus, and the receiving antenna of the first communication apparatus is disposed close to the transmitting antenna of the second communication apparatus. Each of the first and second communication apparatuses is provided with an encoder circuit configured to use a plurality of encoding methods requiring different bandwidths for transmission, respectively; and a decoder circuit configured to use a plurality of decoding methods corresponding to the plurality of encoding methods. The first communication apparatus is provided with a test pattern generator circuit configured to generate test patterns; and a comparator circuit configured to compare two test patterns, and the test patterns are generated to include a plurality of different frequency components when the test patterns are transmitted between the first and second communication apparatuses, the plurality of different frequency components corresponding to the plurality of different bandwidths required by the plurality of encoding methods. The proximity contactless communication method includes: generating a test pattern by the test pattern generator circuit; transmitting the test pattern generated by the test pattern generator circuit from the first communication apparatus to the second communication apparatus through the transmitting antenna of the first communication apparatus and the receiving antenna of the second communication apparatus; returning the test pattern received by the second communication apparatus to the first communication apparatus from the second communication apparatus through the transmitting antenna of the second communication apparatus and the receiving antenna of the first communication apparatus; comparing, by the comparator circuit, the test pattern generated by the test pattern generator circuit, with the test pattern returned from the second communication apparatus; by the first communication apparatus, determining a bandwidth corresponding to frequency components correctly transmitted between the first and second communication apparatuses, based on the returned test pattern, and selecting an encoding method requiring a maximum available bandwidth; by the first communication apparatus, generating a notification message indicating the selected encoding method, encoding the notification message by the encoder circuit of the first communication apparatus using the selected encoding method, and transmitting the encoded notification message from the first communication apparatus to the second communication apparatus through the transmitting antenna of the first communication apparatus and the receiving antenna of the second communication apparatus; by the second communication apparatus, generating a response message including an acknowledgement to the notification message, encoding the response message by the encoder circuit of the second communication apparatus using the selected encoding method, and transmitting the encoded response message from the second communication apparatus to the first communication apparatus through the transmitting antenna of the second communication apparatus and the receiving antenna of the first communication apparatus; and establishing communication between the first and second communication apparatuses when the first communication apparatus receives the response message from the second communication apparatus.

According to the present disclosure, it is possible to establish communication by selecting an appropriate encoding method according to a bandwidth between the antennas of the first and second communication apparatuses, for baseband proximity contactless communication between the antennas of the first and second communication apparatuses.

According to a proximity contactless communication system according to the present disclosure, it is possible to establish communication by selecting an appropriate encoding method according to a bandwidth between the antennas of the first and second communication apparatuses, for baseband proximity contactless communication between the antennas of the first and second communication apparatuses.

The proximity contactless communication system according to the present disclosure can be applied to, for example, a removable memory card such as an SD card and a memory card reader, and also applied to personal computers, smartphones, tablet terminal apparatuses, etc.

The invention claimed is:

1. A proximity contactless communication apparatus which is a first communication apparatus of a proximity contactless communication system for baseband communication between the first communication apparatus and a second communication apparatus, the second communication apparatus comprising at least one transmitting antenna and at least one receiving antenna, the proximity contactless communication apparatus comprising:
   at least one transmitting antenna disposed close to the receiving antenna of the second communication apparatus;
   at least one receiving antenna disposed close to the transmitting antenna of the second communication apparatus;
   an encoder circuit configured to use a plurality of encoding methods requiring different bandwidths for transmission, respectively;
   a decoder circuit configured to use a plurality of decoding methods corresponding to the plurality of encoding methods;
   a test pattern generator circuit configured to generate test patterns;
   a comparator circuit configured to compare two test patterns; and
   a control circuit configured to perform a process for establishing communication between the proximity contactless communication apparatus and the second communication apparatus,
   wherein the test patterns are generated to include a plurality of different frequency components when the test patterns are transmitted between the proximity contactless communication apparatus and the second communication apparatus, the plurality of different frequency components corresponding to the plurality of different bandwidths required by the plurality of encoding methods, and
   wherein in the process for establishing communication between the proximity contactless communication apparatus and the second communication apparatus, the control circuit is configured to:
   compare, by the comparator circuit, a test pattern generated by the test pattern generator circuit, with a test pattern transmitted to the second communication apparatus through the transmitting antenna of the proximity contactless communication apparatus and returned from the second communication apparatus through the receiving antenna of the proximity contactless communication apparatus;
   determine a bandwidth corresponding to frequency components correctly transmitted between the proximity contactless communication apparatus and the second communication apparatus, based on the returned test pattern, and select an encoding method requiring a maximum available bandwidth;
   generate a notification message indicating the selected encoding method, and encode the notification message by the encoder circuit using the selected encoding method, and transmit the encoded notification message to the second communication apparatus through the transmitting antenna of the proximity contactless communication apparatus; and
   establish communication between the proximity contactless communication apparatus and the second communication apparatus, when receiving a response message including an acknowledgement to the notification message, from the second communication apparatus, through the receiving antenna of the proximity contactless communication apparatus.

2. The proximity contactless communication apparatus as claimed in claim 1,
wherein the control circuit is configured to encode the test pattern by the encoder circuit using one of the plurality of encoding methods, before transmitting the test pattern to the second communication apparatus.

3. The proximity contactless communication apparatus as claimed in claim 2,
wherein the control circuit is configured to:
change over the plurality of encoding methods in descending order of required bandwidth, when encoding the test pattern by the encoder circuit; and
select an encoding method requiring a bandwidth corresponding to a first set of frequency components correctly transmitted between the proximity contactless communication apparatus and the second communication apparatus.

4. The proximity contactless communication apparatus as claimed in claim 2,
wherein the control circuit is configured to:
change over the plurality of encoding methods in ascending order of required bandwidth, when encoding the test pattern by the encoder circuit; and
select an encoding method requiring a bandwidth corresponding to a last set of frequency components correctly transmitted between the proximity contactless communication apparatus and the second communication apparatus.

5. The proximity contactless communication apparatus as claimed in claim 1,
wherein the test pattern generator circuit is configured to generate a test pattern including a plurality of different frequency components corresponding to the plurality of different bandwidths required by the plurality of encoding methods.

6. The proximity contactless communication apparatus as claimed in claim 5,
wherein the test pattern is a binary signal having a first level and a second level, and includes a plurality of subpatterns corresponding to the plurality of frequency components, respectively, and
wherein each of the plurality of subpatterns includes: a portion of first levels over a predetermined consecutive bit length, the bit length being determined according to a frequency component corresponding to the subpattern; and a portion of second levels over the same consecutive bit length.

7. The proximity contactless communication apparatus as claimed in claim 6,
wherein the bit length deter mined according to the frequency component decreases as the frequency component increases, and
wherein in each of the plurality of subpatterns, a number of repetitions of the portion of first levels and the portion of second levels increases as a frequency component corresponding to the subpattern increases.

8. The proximity contactless communication apparatus as claimed in claim 1,
wherein when a number of occurrences of communication errors exceeds a reference value after the communication is established between the proximity contactless communication apparatus and the second communication apparatus, the process for establishing communication between the proximity contactless communication apparatus and the second communication apparatus is performed again.

9. The proximity contactless communication apparatus as claimed in claim 1, further comprising a clock generator circuit configured to generate a clock signal of the proximity contactless communication apparatus,
wherein before performing the process for establishing communication between the proximity contactless communication apparatus and the second communication apparatus, the control circuit is configured to:
transmit the clock signal of the proximity contactless communication apparatus to the second communication apparatus through the transmitting antenna of the proximity contactless communication apparatus;
compare the clock signal of the proximity contactless communication apparatus, with a clock signal of the second communication apparatus received from the second communication apparatus through the receiving antenna of the proximity contactless communication apparatus when transmitting the clock signal of the proximity contactless communication apparatus to the second communication apparatus; and
perform the process for establishing communication between the proximity contactless communication apparatus and the second communication apparatus, when the clock signal of the second communication apparatus matches the clock signal of the proximity contactless communication apparatus.

10. The proximity contactless communication apparatus as claimed in claim 9,
wherein when the clock signal of the second communication apparatus differs from the clock signal of the proximity contactless communication apparatus, the control circuit is configured to:
change a clock frequency of the clock signal of the proximity contactless communication apparatus generated by the clock generator circuit; and
compare again the clock signal of the proximity contactless communication apparatus, with a clock signal of the second communication apparatus received from the second communication apparatus when transmitting the clock signal of the proximity contactless communication apparatus to the second communication apparatus.

11. The proximity contactless communication apparatus as claimed in claim 9,
wherein when predetermined timeout time has elapsed before receiving the clock signal of the second communication apparatus that matches the clock signal of the proximity contactless communication apparatus, the control circuit is configured to stop the transmission of the clock signal of the proximity contactless communication apparatus to the second communication apparatus.

12. The proximity contactless communication apparatus as claimed in claim 9,
wherein the test pattern does not include a subpattern as a binary signal having a first and a second level alternating per bit.

13. A proximity contactless communication apparatus which is a second communication apparatus of a proximity contactless communication system for baseband communication between a first communication apparatus and the second communication apparatus, the first communication apparatus comprising at least one transmitting antenna and at least one receiving antenna, the proximity contactless communication apparatus comprising:

at least one transmitting antenna disposed close to the receiving antenna of the first communication apparatus;
at least one receiving antenna disposed close to the transmitting antenna of the first communication apparatus;
an encoder circuit configured to use a plurality of encoding methods requiring different bandwidths for transmission, respectively;
a decoder circuit configured to use a plurality of decoding methods corresponding to the plurality of encoding methods; and
a control circuit configured to perform a process for establishing communication between the proximity contactless communication apparatus and the first communication apparatus,
wherein in the process for establishing communication between the proximity contactless communication apparatus and the first communication apparatus, the control circuit is configured to:
return, when a test pattern including a plurality of different frequency components corresponding to the plurality of different bandwidths required by the plurality of encoding methods is received from the first communication apparatus through the receiving antenna of the proximity contactless communication apparatus, the received test pattern to the first communication apparatus through the transmitting antenna of the proximity contactless communication apparatus;
generate, when a notification message indicating one encoding method selected from the plurality of encoding methods is received from the first communication apparatus through the receiving antenna of the proximity contactless communication apparatus, a response message including an acknowledgement to the notification message, and encode the response message by the encoder circuit using the selected encoding method, and transmits the encoded response message to the first communication apparatus through the transmitting antenna of the proximity contactless communication apparatus; and
establish communication between the proximity contactless communication apparatus and the first communication apparatus.

14. The proximity contactless communication apparatus as claimed in claim 13, further comprising a clock generator circuit configured to generate a clock signal of the proximity contactless communication apparatus, based on a clock signal of the first communication apparatus received from the first communication apparatus through the receiving antenna of the proximity contactless communication apparatus,
wherein before performing the process for establishing communication between the proximity contactless communication apparatus and the first communication apparatus, the control circuit is configured to transmit the clock signal of the proximity contactless communication apparatus to the first communication apparatus through the transmitting antenna of the proximity contactless communication apparatus.

15. A proximity contactless communication system for baseband communication between a first communication apparatus and a second communication apparatus,
wherein each of the first and second communication apparatuses comprises at least one transmitting antenna and at least one receiving antenna, the transmitting antenna of the first communication apparatus is disposed close to the receiving antenna of the second communication apparatus, and the receiving antenna of the first communication apparatus is disposed close to the transmitting antenna of the second communication apparatus,
wherein each of the first and second communication apparatuses comprises an encoder circuit configured to use a plurality of encoding methods requiring different bandwidths for transmission, respectively; and a decoder circuit configured to use a plurality of decoding methods corresponding to the plurality of encoding methods,
wherein the first communication apparatus comprises a test pattern generator circuit configured to generate test patterns; and a comparator circuit configured to compare two test patterns, and the test patterns are generated to include a plurality of different frequency components when the test patterns are transmitted between the first and second communication apparatuses, the plurality of different frequency components corresponding to the plurality of different bandwidths required by the plurality of encoding methods, and
wherein the first communication apparatus is configured to: generate a test pattern by the test pattern generator circuit; and transmit the test pattern generated by the test pattern generator circuit to the second communication apparatus through the transmitting antenna of the first communication apparatus and the receiving antenna of the second communication apparatus;
wherein the second communication apparatus is configured to: return the test pattern received by the second communication apparatus to the first communication apparatus through the transmitting antenna of the second communication apparatus and the receiving antenna of the first communication apparatus;
wherein the first communication apparatus is configured to: compare, by the comparator circuit, the test pattern generated by the test pattern generator circuit, with the test pattern returned from the second communication apparatus;
wherein the first communication apparatus is configured to: determine a bandwidth corresponding to frequency components correctly transmitted between the first and second communication apparatuses, based on the returned test pattern, and select an encoding method requiring a maximum available bandwidth;
wherein the first communication apparatus is configured to: generate a notification message indicating the selected encoding method, encode the notification message by the encoder circuit of the first communication apparatus using the selected encoding method, and transmit the encoded notification message to the second communication apparatus through the transmitting antenna of the first communication apparatus and the receiving antenna of the second communication apparatus;
wherein the second communication apparatus is configured to: generate a response message including an acknowledgement to the notification message, encode the response message by the encoder circuit of the second communication apparatus using the selected encoding method, and transmit the encoded response message to the first communication apparatus through the transmitting antenna of the second communication apparatus and the receiving antenna of the first communication apparatus; and
wherein the first and second communication apparatuses are configured to: establish communication between the first and second communication apparatuses when the first communication apparatus receives the response message from the second communication apparatus.

16. A proximity contactless communication system as claimed in claim 15,
wherein the first communication apparatus further comprises a clock generator circuit configured to generate a clock signal of the first communication apparatus,
wherein the second communication apparatus further comprises a clock generator circuit configured to generate a clock signal of the second communication apparatus, based on a clock signal of the first communication apparatus received from the first communication apparatus through the receiving antenna of the second communication apparatus,
wherein before performing the process for establishing communication between the first communication apparatus and the second communication apparatus, the control circuit of the first communication apparatus is configured to: transmit the clock signal of the first communication apparatus to the second communication apparatus through the transmitting antenna of the first communication apparatus;
wherein the control circuit of the second communication apparatus is configured to transmit the clock signal of the second communication apparatus to the first communication apparatus through the transmitting antenna of the second communication apparatus
wherein the first communication apparatus is configured to: compare the clock signal of the first communication apparatus, with a clock signal of the second communication apparatus received from the second communication apparatus through the receiving antenna of the first communication apparatus when transmitting the clock signal of the first communication apparatus to the second communication apparatus; and
wherein the first and second communication apparatuses are configured to: perform the process for establishing communication between the first communication apparatus and the second communication apparatus, when the clock signal of the second communication apparatus matches the clock signal of the first communication apparatus.

17. A proximity contactless communication method for baseband communication between a first communication apparatus and a second communication apparatus,
wherein each of the first and second communication apparatuses comprises at least one transmitting antenna and at least one receiving antenna, the transmitting antenna of the first communication apparatus is disposed close to the receiving antenna of the second communication apparatus, and the receiving antenna of the first communication apparatus is disposed close to the transmitting antenna of the second communication apparatus,
wherein each of the first and second communication apparatuses comprises an encoder circuit configured to use a plurality of encoding methods requiring different bandwidths for transmission, respectively; and a decoder circuit configured to use a plurality of decoding methods corresponding to the plurality of encoding methods,
wherein the first communication apparatus comprises a test pattern generator circuit configured to generate test patterns; and a comparator circuit configured to compare two test patterns, and the test patterns are generated to include a plurality of different frequency components when the test patterns are transmitted between the first and second communication apparatuses, the plurality of different frequency components corresponding to the plurality of different bandwidths required by the plurality of encoding methods, and
wherein the proximity contactless communication method includes:
generating a test pattern by the test pattern generator circuit;
transmitting the test pattern generated by the test pattern generator circuit from the first communication apparatus to the second communication apparatus through the transmitting antenna of the first communication apparatus and the receiving antenna of the second communication apparatus;
returning the test pattern received by the second communication apparatus to the first communication apparatus from the second communication apparatus through the transmitting antenna of the second communication apparatus and the receiving antenna of the first communication apparatus;
comparing, by the comparator circuit, the test pattern generated by the test pattern generator circuit, with the test pattern returned from the second communication apparatus;
by the first communication apparatus, determining a bandwidth corresponding to frequency components correctly transmitted between the first and second communication apparatuses, based on the returned test pattern, and selecting an encoding method requiring a maximum available bandwidth;
by the first communication apparatus, generating a notification message indicating the selected encoding method, encoding the notification message by the encoder circuit of the first communication apparatus using the selected encoding method, and transmitting the encoded notification message from the first communication apparatus to the second communication apparatus through the transmitting antenna of the first communication apparatus and the receiving antenna of the second communication apparatus;
by the second communication apparatus, generating a response message including an acknowledgement to the notification message, encoding the response message by the encoder circuit of the second communication apparatus using the selected encoding method, and transmitting the encoded response message from the second communication apparatus to the first communication apparatus through the transmitting antenna of the second communication apparatus and the receiving antenna of the first communication apparatus; and
establishing communication between the first and second communication apparatuses when the first communication apparatus receives the response message from the second communication apparatus.

* * * * *